US008989562B2

(12) United States Patent
Kummer et al.

(10) Patent No.: US 8,989,562 B2
(45) Date of Patent: Mar. 24, 2015

(54) FACILITATING CONCURRENT RECORDING OF MULTIPLE TELEVISION CHANNELS

(71) Applicant: EchoStar Technologies, LLC, Englewood, CO (US)

(72) Inventors: David Kummer, Highlands Ranch, CO (US); Henry Gregg Martch, Parker, CO (US); Morgan Kirby, Palmer Lake, CO (US); Anand Menon, Parker, CO (US); Germar Schaefer, Monument, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 13/799,653

(22) Filed: Mar. 13, 2013

(65) Prior Publication Data

US 2013/0243402 A1    Sep. 19, 2013

Related U.S. Application Data

(60) Provisional application No. 61/611,483, filed on Mar. 15, 2012, provisional application No. 61/745,706, filed on Dec. 24, 2012.

(51) Int. Cl.
*H04N 5/76*    (2006.01)
*H04N 5/91*    (2006.01)
(Continued)

(52) U.S. Cl.
CPC ............... *H04N 5/91* (2013.01); *H04N 5/782* (2013.01); *H04N 21/4147* (2013.01);
(Continued)

(58) Field of Classification Search
CPC .............. H04N 5/782; H04N 21/4334; H04N 21/47214; H04N 5/44543; H04N 5/76
See application file for complete search history.

(56) References Cited

U.S. PATENT DOCUMENTS 4,706,121 A    11/1987    Young
4,723,246 A     2/1988    Weldon, Jr.
(Continued)

FOREIGN PATENT DOCUMENTS

EP    0 903 743 A    3/1999
EP    0 973 333 A    1/2000
(Continued)

OTHER PUBLICATIONS

International Search Report and Written Opinion of PCT/US2013/32176 mailed on Jun. 25, 2013, 15 pages.
(Continued)

*Primary Examiner* — William C Vaughn, Jr.
*Assistant Examiner* — Daniel Tekle
(74) *Attorney, Agent, or Firm* — Kilpatrick Townsend & Stockton LLP

(57) ABSTRACT

An arrangement for grouping multiple television channels for recording is presented. Television channel usage data indicative of television programs being requested by users of the television receivers may be received. The television channel usage data may provide usage data for television channels being transmitted using a plurality of transponders. The television channel usage data may be analyzed to determine a grouping of television channels. Based on the television channel usage data, a television channel may be reassigned from a first transponder to a second transponder for transmission to the plurality of television receivers such that the grouping of television channels are transmitted using the second transponder.

16 Claims, 7 Drawing Sheets

(51) Int. Cl.
  *H04N 5/782* (2006.01)
  *H04N 21/4147* (2011.01)
  *H04N 21/433* (2011.01)
  *H04N 21/458* (2011.01)
  *H04N 21/472* (2011.01)
  *H04N 21/475* (2011.01)
  *H04N 21/61* (2011.01)
  *H04N 5/765* (2006.01)

(52) U.S. Cl.
  CPC ...... *H04N 21/4334* (2013.01); *H04N 21/4583* (2013.01); *H04N 21/47214* (2013.01); *H04N 21/4751* (2013.01); *H04N 21/6143* (2013.01); *H04N 5/765* (2013.01)
  USPC ........................................................ 386/297

(56) References Cited

U.S. PATENT DOCUMENTS

| | | | |
|---|---|---|---|
| 4,802,215 A | 1/1989 | Mason | |
| 5,187,589 A | 2/1993 | Kono et al. | |
| 5,335,277 A | 8/1994 | Harvey et al. | |
| 5,483,277 A | 1/1996 | Granger | |
| 5,488,658 A | 1/1996 | Hirashima | |
| 5,541,738 A | 7/1996 | Mankovitz | |
| 5,642,153 A | 6/1997 | Chaney et al. | |
| 5,684,969 A | 11/1997 | Ishida | |
| 5,805,763 A | 9/1998 | Lawler et al. | |
| 5,974,218 A | 10/1999 | Nagasaka et al. | |
| 6,628,891 B1 | 9/2003 | Vantalon et al. | |
| 6,701,528 B1 | 3/2004 | Arsenault et al. | |
| 6,766,523 B2 | 7/2004 | Herley | |
| 6,798,971 B2 | 9/2004 | Potrebic | |
| 6,938,208 B2 | 8/2005 | Reichardt | |
| 7,024,676 B1 | 4/2006 | Klopfenstein | |
| 7,409,140 B2 | 8/2008 | Rodriguez et al. | |
| 7,487,529 B1 | 2/2009 | Orlick | |
| 7,490,169 B1 | 2/2009 | Ogdon et al. | |
| 7,493,312 B2 | 2/2009 | Liu et al. | |
| 7,542,656 B2 | 6/2009 | Cho et al. | |
| 7,577,751 B2 | 8/2009 | Vinson et al. | |
| 7,590,993 B1 | 9/2009 | Hendricks et al. | |
| 7,715,552 B2 | 5/2010 | Pinder et al. | |
| 7,730,517 B1 | 6/2010 | Rey et al. | |
| 7,739,711 B2 | 6/2010 | Finseth et al. | |
| 7,760,986 B2 | 7/2010 | Beuque | |
| 7,804,861 B2 | 9/2010 | Kim | |
| 7,848,618 B2 | 12/2010 | Potrebic et al. | |
| 7,856,557 B2 | 12/2010 | Beuque | |
| 7,926,078 B2 | 4/2011 | Arsenault et al. | |
| 7,929,697 B2 | 4/2011 | McNeely et al. | |
| 7,962,937 B2 | 6/2011 | Cho et al. | |
| 8,006,268 B2 | 8/2011 | Sloo | |
| 8,201,194 B2 | 6/2012 | Wijnands et al. | |
| 8,321,466 B2 | 11/2012 | Black et al. | |
| 8,437,622 B2 | 5/2013 | Casagrande | |
| 8,447,170 B2 | 5/2013 | Casagrande | |
| 8,566,873 B2 | 10/2013 | Sie et al. | |
| 8,584,167 B2 | 11/2013 | Vanduyn | |
| 8,606,088 B2 | 12/2013 | Kummer et al. | |
| 8,627,349 B2 | 1/2014 | Kirby et al. | |
| 8,660,412 B2 | 2/2014 | Kummer et al. | |
| 8,774,608 B2 | 7/2014 | Kummer et al. | |
| 8,819,722 B2 | 8/2014 | Kummer et al. | |
| 8,850,476 B2 | 9/2014 | VanDuyn et al. | |
| 8,867,893 B2 | 10/2014 | Kirby | |
| 2001/0028782 A1 | 10/2001 | Ohno et al. | |
| 2001/0033736 A1 | 10/2001 | Yap et al. | |
| 2001/0034787 A1 | 10/2001 | Takao et al. | |
| 2002/0044658 A1 | 4/2002 | Wasilewski et al. | |
| 2002/0054752 A1 | 5/2002 | Wood et al. | |
| 2002/0055343 A1 | 5/2002 | Stetzler et al. | |
| 2002/0087979 A1 | 7/2002 | Dudkiewicz et al. | |
| 2002/0087983 A1 | 7/2002 | Son et al. | |
| 2002/0092021 A1 | 7/2002 | Yap et al. | |
| 2002/0095510 A1 | 7/2002 | Sie et al. | |
| 2002/0097340 A1 | 7/2002 | Takagi et al. | |
| 2002/0144266 A1* | 10/2002 | Goldman et al. | 725/46 |
| 2002/0152299 A1 | 10/2002 | Traversat et al. | |
| 2002/0164147 A1 | 11/2002 | Suda | |
| 2002/0168178 A1 | 11/2002 | Rodriguez et al. | |
| 2002/0188943 A1 | 12/2002 | Freeman et al. | |
| 2003/0026423 A1 | 2/2003 | Unger et al. | |
| 2003/0078930 A1 | 4/2003 | Surcouf et al. | |
| 2003/0110514 A1 | 6/2003 | West et al. | |
| 2003/0177495 A1 | 9/2003 | Needham et al. | |
| 2003/0200548 A1 | 10/2003 | Baran et al. | |
| 2003/0208763 A1 | 11/2003 | McElhatten et al. | |
| 2004/0001087 A1 | 1/2004 | Warmus et al. | |
| 2004/0015992 A1 | 1/2004 | Hasegawa et al. | |
| 2004/0015999 A1 | 1/2004 | Carlucci et al. | |
| 2004/0103428 A1 | 5/2004 | Seok et al. | |
| 2004/0162871 A1 | 8/2004 | Pabla et al. | |
| 2004/0218905 A1 | 11/2004 | Green et al. | |
| 2004/0242150 A1 | 12/2004 | Wright et al. | |
| 2004/0268387 A1 | 12/2004 | Wendling | |
| 2005/0120049 A1 | 6/2005 | Kanegae et al. | |
| 2005/0125683 A1 | 6/2005 | Matsuyama et al. | |
| 2005/0147383 A1 | 7/2005 | Ihara | |
| 2005/0229213 A1 | 10/2005 | Ellis et al. | |
| 2005/0271365 A1 | 12/2005 | Hisatomi | |
| 2006/0056800 A1 | 3/2006 | Shimagami et al. | |
| 2006/0075434 A1* | 4/2006 | Chaney et al. | 725/48 |
| 2006/0206819 A1 | 9/2006 | Tsuji et al. | |
| 2006/0212900 A1 | 9/2006 | Ismail et al. | |
| 2006/0215993 A1 | 9/2006 | Yamada | |
| 2006/0274208 A1 | 12/2006 | Pedlow, Jr. | |
| 2007/0016546 A1 | 1/2007 | De Vorchik et al. | |
| 2007/0039032 A1 | 2/2007 | Goldey et al. | |
| 2007/0061378 A1 | 3/2007 | Lee et al. | |
| 2007/0157253 A1 | 7/2007 | Ellis et al. | |
| 2007/0165855 A1 | 7/2007 | Inui | |
| 2007/0192586 A1 | 8/2007 | McNeely | |
| 2007/0204288 A1 | 8/2007 | Candelore | |
| 2007/0234395 A1 | 10/2007 | Dureau et al. | |
| 2007/0258596 A1 | 11/2007 | Kahn et al. | |
| 2008/0046929 A1 | 2/2008 | Cho et al. | |
| 2008/0092164 A1 | 4/2008 | Agarwal et al. | |
| 2008/0104534 A1 | 5/2008 | Park et al. | |
| 2008/0137850 A1 | 6/2008 | Mamidwar | |
| 2008/0141322 A1 | 6/2008 | Jang et al. | |
| 2008/0152039 A1 | 6/2008 | Shah et al. | |
| 2008/0184327 A1 | 7/2008 | Ellis et al. | |
| 2008/0216119 A1 | 9/2008 | Pfeffer et al. | |
| 2008/0216136 A1 | 9/2008 | Pfeffer et al. | |
| 2008/0222681 A1 | 9/2008 | Kwon | |
| 2008/0271077 A1 | 10/2008 | Kim et al. | |
| 2008/0273698 A1 | 11/2008 | Manders et al. | |
| 2008/0276284 A1 | 11/2008 | Bumgardner et al. | |
| 2008/0288461 A1 | 11/2008 | Glennon et al. | |
| 2008/0291206 A1 | 11/2008 | Uchimura et al. | |
| 2008/0298585 A1 | 12/2008 | Maillard et al. | |
| 2008/0301740 A1 | 12/2008 | Tsutsui | |
| 2009/0051579 A1 | 2/2009 | Inaba et al. | |
| 2009/0067621 A9 | 3/2009 | Wajs | |
| 2009/0080930 A1 | 3/2009 | Shinotsuka et al. | |
| 2009/0100466 A1 | 4/2009 | Migos | |
| 2009/0129749 A1 | 5/2009 | Oyamatsu et al. | |
| 2009/0165057 A1 | 6/2009 | Miller et al. | |
| 2009/0172722 A1 | 7/2009 | Kahn et al. | |
| 2009/0178098 A1 | 7/2009 | Westbrook et al. | |
| 2009/0254962 A1 | 10/2009 | Hendricks et al. | |
| 2009/0260038 A1 | 10/2009 | Acton et al. | |
| 2009/0320073 A1 | 12/2009 | Reisman | |
| 2010/0020794 A1 | 1/2010 | Cholas et al. | |
| 2010/0037282 A1 | 2/2010 | Iwata et al. | |
| 2010/0050225 A1 | 2/2010 | Bennett | |
| 2010/0086277 A1 | 4/2010 | Craner | |
| 2010/0100899 A1 | 4/2010 | Bradbury et al. | |
| 2010/0115121 A1 | 5/2010 | Roos et al. | |
| 2010/0135639 A1 | 6/2010 | Ellis et al. | |
| 2010/0158479 A1 | 6/2010 | Craner | |
| 2010/0158480 A1 | 6/2010 | Jung et al. | |

(56) References Cited

U.S. PATENT DOCUMENTS

| | | | |
|---|---|---|---|
| 2010/0169926 A1 | 7/2010 | Westberg et al. | |
| 2010/0195827 A1 | 8/2010 | Lee et al. | |
| 2010/0239228 A1 | 9/2010 | Sano | |
| 2010/0247067 A1 | 9/2010 | Gratton | |
| 2010/0265391 A1 | 10/2010 | Muramatsu et al. | |
| 2010/0284537 A1 | 11/2010 | Inbar | |
| 2010/0313222 A1 | 12/2010 | Lee et al. | |
| 2011/0001879 A1* | 1/2011 | Goldey et al. | 348/584 |
| 2011/0007218 A1 | 1/2011 | Moran et al. | |
| 2011/0043652 A1 | 2/2011 | King et al. | |
| 2011/0078750 A1 | 3/2011 | Tam et al. | |
| 2011/0131413 A1 | 6/2011 | Moon et al. | |
| 2011/0138169 A1 | 6/2011 | Michel | |
| 2011/0162011 A1 | 6/2011 | Hassell et al. | |
| 2011/0179453 A1 | 7/2011 | Poniatowski | |
| 2011/0225616 A1 | 9/2011 | Ellis | |
| 2011/0255002 A1 | 10/2011 | Witheiler | |
| 2011/0311045 A1 | 12/2011 | Candelore et al. | |
| 2012/0278837 A1 | 11/2012 | Curtis et al. | |
| 2012/0296745 A1 | 11/2012 | Harper et al. | |
| 2012/0311534 A1 | 12/2012 | Fox et al. | |
| 2012/0311634 A1 | 12/2012 | Van Duyn | |
| 2013/0014146 A1 | 1/2013 | Bhatia et al. | |
| 2013/0051555 A1 | 2/2013 | Martch et al. | |
| 2013/0051758 A1 | 2/2013 | Kummer et al. | |
| 2013/0051764 A1 | 2/2013 | Casagrande | |
| 2013/0051766 A1 | 2/2013 | Martch et al. | |
| 2013/0051773 A1 | 2/2013 | Casagrande | |
| 2013/0054579 A1 | 2/2013 | Kennedy | |
| 2013/0055304 A1 | 2/2013 | Kirby et al. | |
| 2013/0055305 A1 | 2/2013 | Martch et al. | |
| 2013/0055310 A1 | 2/2013 | VanDuyn et al. | |
| 2013/0055311 A1 | 2/2013 | Kirby et al. | |
| 2013/0055314 A1 | 2/2013 | Martch | |
| 2013/0055333 A1 | 2/2013 | Kummer | |
| 2013/0216208 A1 | 8/2013 | Kummer et al. | |
| 2013/0223814 A1 | 8/2013 | Casagrande | |
| 2013/0243397 A1 | 9/2013 | Minnick et al. | |
| 2013/0243398 A1 | 9/2013 | Templeman et al. | |
| 2013/0243399 A1 | 9/2013 | Casagrande et al. | |
| 2013/0243401 A1 | 9/2013 | Casagrande | |
| 2013/0243403 A1 | 9/2013 | Martch | |
| 2013/0243405 A1 | 9/2013 | Templeman et al. | |
| 2013/0243406 A1 | 9/2013 | Kirby | |
| 2013/0247089 A1 | 9/2013 | Kummer et al. | |
| 2013/0247090 A1 | 9/2013 | Kummer et al. | |
| 2013/0247106 A1 | 9/2013 | Martch et al. | |
| 2013/0247107 A1 | 9/2013 | Templeman | |
| 2013/0247111 A1 | 9/2013 | Templeman et al. | |
| 2013/0247115 A1 | 9/2013 | Minnick | |
| 2013/0298166 A1 | 11/2013 | Herrington et al. | |
| 2013/0347037 A1 | 12/2013 | Soroushian | |
| 2014/0047477 A1 | 2/2014 | VanDuyn | |
| 2014/0050462 A1 | 2/2014 | Kummer et al. | |
| 2014/0126889 A1 | 5/2014 | Kummer et al. | |
| 2014/0130094 A1 | 5/2014 | Kirby et al. | |
| 2014/0341377 A1 | 11/2014 | Kummer et al. | |
| 2014/0344858 A1 | 11/2014 | Minnick | |

FOREIGN PATENT DOCUMENTS

| | | |
|---|---|---|
| EP | 1 168 347 A | 1/2002 |
| EP | 1372339 A2 | 12/2003 |
| EP | 2 018 059 A1 | 1/2009 |
| EP | 1 667 452 B1 | 11/2011 |
| EP | 12825080 A | 12/2014 |
| WO | 2004/057610 A1 | 7/2004 |
| WO | 2008/010689 A1 | 1/2008 |
| WO | 2008/060486 A2 | 5/2008 |
| WO | 2011/027236 A1 | 3/2011 |
| WO | 2013/028824 A3 | 2/2013 |
| WO | 2013/138606 A1 | 9/2013 |
| WO | 2013/138610 A1 | 9/2013 |
| WO | 2013/138638 A1 | 9/2013 |
| WO | 2013/138689 A1 | 9/2013 |
| WO | 2013/138740 A1 | 9/2013 |

OTHER PUBLICATIONS

International Search Report and Written Opinion of PCT/US2013/031565 mailed on May 31, 2013, 103 pages.
International Search Report and Written Opinion of PCT/US2013/031915 mailed on Jun. 3, 2013, 7 pages.
International Search Report of PCT/KR2007/003521 mailed on Oct. 23, 2007.
International Search Report of PCT/IB2003/005737 mailed on Mar. 3, 2004.
Jensen, Craig. "Fragmentation: the condition, the cause, the cure" Online!, Executive Software International, 1994: retrieved from Internet: <URL: www.executive.com/fragbook/fragbook.htm> retrieved on Mar. 2, 2004 Chapter: "How a disk works", Section: "The original problem".
U.S. Appl. No. 13/795,914, filed Mar. 6, 2013, Non-Final Office Action mailed Oct. 11, 2013, 17 pages.
International Search Report and Written Opinion of PCT/US2012/51992 mailed Nov. 2, 2012, 15 pages.
International Search Report and Written Opinion of PCT/US2012/51987 mailed Oct. 23, 2012, 20 pages.
International Search Report and Written Opinion of PCT/US2012/051984 mailed Nov. 5, 2012, 13 pages.
International Search Report and Written Opinion of PCT/US2012/52002 mailed Oct. 16, 2012, 17 pages.
International Preliminary Report on Patentability for PCT/US2012/052002 mailed on Apr. 17, 2014, 10 pages.
International Search Report and Written Opinion of PCT/US2012/51964 mailed Nov. 2, 2012, 13 pages.
International Search Report and Written Opinion of PCT/US2012/052011 mailed Dec. 17, 2012, 44 pages.
International Preliminary Report on Patentability, PCT/US2012/052011, mailed on Mar. 6, 2014, 6 pages.
International Preliminary Report on Patentability, PCT/US2012/051984, mailed on Mar. 6, 2014, 8 pages.
International Preliminary Report on Patentability, PCT/US2012/051964, mailed on Apr. 10, 2014, 7 pages.
International Preliminary Report on Patentability, PCT/US2012/051992, mailed on Apr. 3, 2014, 7 pages.
International Preliminary Report on Patentability, PCT/US2012/051987, mailed on Mar. 6, 2014, 7 pages.
U.S. Appl. No. 13/149,852, filed May 31, 2011, Non-Final Office Action mailed Dec. 12, 2012, 9 pages.
U.S. Appl. No. 13/149,852, filed May 31, 2011, Final Office Action mailed Mar. 26, 2013, 13 pages.
U.S. Appl. No. 13/149,852, filed May 31, 2011, Notice of Allowance mailed Jul. 11, 2013, 13 pages.
U.S. Appl. No. 13/286,157, filed Oct. 31, 2011, Non-Final Office Action mailed Jan. 17, 2013, 20 pages.
U.S. Appl. No. 13/286,157, filed Oct. 31, 2011, Non-Final Office Action mailed Jul. 25, 2013, 49 pages.
U.S. Appl. No. 13/286,157, filed Oct. 31, 2011, Notice of Allowance mailed Feb. 3, 2014, 81 pages.
U.S. Appl. No. 13/215,702, filed Aug. 23, 2011, Notice of Allowance mailed Feb. 11, 2013, 13 pages.
U.S. Appl. No. 13/288,002, filed Nov. 2, 2011, Non-final Office Action mailed Sep. 26, 2013, 15 pages.
U.S. Appl. No. 13/288,002, filed Nov. 2, 2011, Final Office Action mailed Mar. 27, 2014, 20 pages.
U.S. Appl. No. 13/302,852, filed Nov. 22, 2011, Non-Final Rejection mailed May 23, 2013, 19 pages.
U.S. Appl. No. 13/302,852, filed Nov. 22, 2011, Final Rejection mailed Dec. 9, 2013, 23 pages.
U.S. Appl. No. 13/324,831, filed Dec. 13, 2011 Non-Final Office Action mailed Feb. 28, 2013, 23 pages.
U.S. Appl. No. 13/324,831, filed Dec. 13, 2011 Notice of Allowance mailed Sep. 4, 2013, 22 pages.
U.S. Appl. No. 13/292,047, filed Nov. 8, 2011 Non-Final Office Action mailed Jan. 18, 2013, 17 pages.

(56) References Cited

OTHER PUBLICATIONS

U.S. Appl. No. 13/292,047, filed Nov. 8, 2011 Final Office Action mailed Aug. 19, 2013, 17 pages.
U.S. Appl. No. 13/614,899, filed Sep. 13, 2012 Non-Final Office Action mailed Feb. 5, 2013, 17 pages.
U.S. Appl. No. 13/614,899, filed Sep. 13, 2012, Non-Final Office Action mailed Sep. 17, 2013, 17 pages.
U.S. Appl. No. 13/614,899, filed Sep. 13, 2012, Final Office Action mailed Mar. 17, 2014, 41 pages.
U.S. Appl. No. 13/291,014, filed Nov. 7, 2011, Non-Final Office Action mailed Mar. 29, 2013, 21 pages.
U.S. Appl. No. 13/291,014, filed Nov. 7, 2011, Notice of Allowance mailed Aug. 7, 2013, 16 pages.
U.S. Appl. No. 13/215,598, filed Aug. 23, 2011, Non-Final Office Action mailed Jun. 20, 2013, 15 pages.
U.S. Appl. No. 13/215,598, filed Aug. 23, 2011, Final Office Action mailed Nov. 21, 2013, 23 pages.
U.S. Appl. No. 13/215,598, filed Aug. 23, 2011, Non-Final Office Action mailed Feb. 6, 2014, 12 pages.
U.S. Appl. No. 13/215,655, filed Aug. 23, 2011, Non-Final Office Action mailed Sep. 6, 2013, 27 pages.
U.S. Appl. No. 13/215,655, filed Aug. 23, 2011, Final Office Action mailed Dec. 18, 2013, 20 pages.
U.S. Appl. No. 13/215,916, filed Aug. 23, 2011, Notice of Allowance mailed Jan. 4, 2013, 10 pages.
U.S. Appl. No. 13/294,055, filed Nov. 11, 2011, Non-Final Office Action mailed Aug. 14, 2013, 32 pages.
U.S. Appl. No. 13/294,005, filed Nov. 11, 2011, Final Office Action mailed Jan. 3, 2014, 29 pages.
U.S. Appl. No. 13/592,976, filed Aug. 23, 2012, Notice of Allowance mailed Oct. 7, 2013, 18 pages.
U.S. Appl. No. 13/797,173, filed Mar. 12, 2013, Non Final Office Action mailed May 15, 2014, 28 pages.
U.S. Appl. No. 13/829,350, filed Mar. 14, 2013, Non Final Office Action mailed Feb. 28, 2014, 29 pages.
U.S. Appl. No. 13/828,001, filed Mar. 14, 2013, Notice of Allowance mailed Apr. 25, 2014, 43 pages.
U.S. Appl. No. 13/799,719, filed Mar. 13, 2013, Non Final Office Action mailed Oct. 25, 2013, 79 pages.
U.S. Appl. No. 13/799,719, filed Mar. 13, 2013, Notice of Allowance mailed Apr. 23, 2014, 141 pages.
U.S. Appl. No. 14/064,423, filed Oct. 28, 2013, Non-Final Office Action mailed Dec. 20, 2013, 18 pages.
U.S. Appl. No. 14/064,423, filed Oct. 28, 2013, Notice of Allowance mailed Mar. 4, 2013, 37 pages.
Author Unknown, "Move Networks is Delivering the Next Generation of Television," Move Networks. Obtained online Jun. 10, 2014. Accessed at http://movenetworks.com/, 2 pages.
Design and implementation of a multi-stream cableCARD with a high-speed DVB-common descrambler; Joonyoung Jung, Ohyung Kwon, Sooin Lee; In proceeding of: Proceedings of the 14th ACM International Conference on Multimedia, Santa Barbara, CA, USA, Oct. 23-27, 2006, 4 pages.
U.S. Appl. No. 13/757,168, filed Feb. 1, 2013 Non Final Office Action mailed Jun. 4, 2014, 23 pages.
U.S. Appl. No. 13/799,604, filed Mar. 13, 2013 Non Final Office Action mailed Jun. 6, 2014, 24 pages.
U.S. Appl. No. 13/614,899, filed Sep. 13, 2012 Non-Final Office Action mailed May 20, 2014, 25 pages.
U.S. Appl. No. 13/215,598, filed Aug. 23, 2011 Final Office Action mailed Jul. 2, 2014, 22 pages.
U.S. Appl. No. 13/294,005, filed Nov. 11, 2011 Non-Final Office Action mailed May 20, 2014, 33 pages.
U.S. Appl. No. 13/829,350, filed Mar. 14, 2013 Non Final Office Action mailed Jul. 29, 2014, 24 pages.
U.S. Appl. No. 13/795,914, filed Mar. 6, 2013 Notice of Allowance mailed Jul. 21, 2014, 13 pages.
U.S. Appl. No. 13/795,914, filed Mar. 6, 2013 Final Office Action mailed Apr. 3, 2014, 17 pages.
International Search Report and Written Opinion of PCT/US2013/031432 mailed May 28, 2013, 10 pages.
International Preliminary Report on Patentability for PCT/US2013/031432 issued Sep. 16, 2014, 9 pages.
International Search Report and Written Opinion of PCT/US2013/031445 mailed May 24, 2013, 11 pages.
International Preliminary Report on Patentability for PCT/US2013/031445 issued Sep. 16, 2014, 10 pages.
International Preliminary Report on Patentability for PCT/US2013/032176 mailed Sep. 25, 2014, 7 pages.
International Preliminary Report on Patentability for PCT/US2013/031565 issued Sep. 16, 2014, 18 pages.
International Preliminary Report on Patentability for PCT/US2013/031915 issued Sep. 16, 2014, 5 pages.
U.S. Appl. No. 13/302,852, filed Nov. 22, 2011, Non-Final Rejection mailed Sep. 2, 2014, 28 pages.
U.S. Appl. No. 13/793,636, filed Mar. 11, 2013, Non-Final Office Action mailed Sep. 29, 2014, 27 pages.
U.S. Appl. No. 13/800,477, filed Mar. 13, 2013, Non-Final Office Action mailed Sep. 11, 2014, 34 pages.
Author Unknown, "EE Launches home TV service in UK," dated Oct. 8, 2014, 3 pages. Retrieved on Oct. 13, 2014 from http://www.bbc.com/news/technology-29535279.
McCANN, John, "EE TV set top takes aim at Sky, Virgin Media and YouView," dated Oct. 8, 2014, 5 pages. Retrieved on Oct. 13, 2014 from http://www.techradar.com/news/television/ee-tv-set-top-boxtakes-aim-at-sky-virgin-media-and-youview-1268223.
Williams, Christopher, "EE to launch TV set-top box," dated Oct. 7, 2014, 2 pages. Retrieved on Oct. 13, 2014 from http://www.telegraph.co.uk/finance/newsbysector/mediatechnologyandtelecoms/telecoms/11147319/ EE-to-launch-TV-set-top-box.html.
Author Unknown, "EE TV Its simply great television," Accessed on Oct. 13, 2014, 11 pages. Retrieved from https//ee.co.uk/ee-and-me/ee-tv.
U.S. Appl. No. 13/856,752, filed Apr. 4, 2013, Non Final Office Action mailed Nov. 5, 2014, 34 pages.
U.S. Appl. No. 13/757,168, filed Feb. 1, 2013, Notice of Allowance mailed Oct. 14, 2014, 28 pages.
U.S. Appl. No. 13/215,598, filed Aug 23, 2011, Non-Final Office Action mailed Nov. 25, 2014, 18 pages.
U.S. Appl. No. 13/294,005, filed Nov. 11, 2011, Notice of Allowance mailed Oct. 31, 2014, 24 pages.
U.S. Appl. No. 13/797,173, filed Mar. 12, 2013, Notice of Allowance mailed Nov. 24, 2014, 37 pages.
Extended European Search Report for EP 12825080 mailed Sep. 11, 2014, 10 pages.
International Preliminary Report on Patentability for PCT/US2013/031440 mailed Sep. 25, 2014, 8 pages.

\* cited by examiner

FACILITATING CONCURRENT RECORDING OF MULTIPLE TELEVISION CHANNELS

CROSS-REFERENCES

This application claims priority to U.S. provisional application 61/611,483, filed Mar. 15, 2012, entitled "Reception, Recording, Storage, and Manipulation of Multiple Television Channels", the entire disclosure of which is hereby incorporated by reference for all purposes.

This application also claims priority to U.S. provisional application 61/745,706, filed Dec. 24, 2012, entitled "Facilitating Concurrent Recording of Multiple Television Channels," the entire disclosure of which is hereby incorporated by reference for all purposes.

BACKGROUND

A television viewer may desire to watch and/or record multiple television channels at the same time. For instance, during weekday primetime, many television programs may be broadcast simultaneously on different television channels that the television viewer desires to either watch live and/or store for later viewing. For many cable and satellite television distribution systems, a television receiver may be used to receive, store, and present television channels via a television (or other form of display device). Such television receivers may have limited capabilities to concurrently display and/or record multiple television channels at the same time.

SUMMARY

In some embodiments, a system for grouping multiple television channels for recording is presented. The system may include one or more processors. The system may include a memory communicatively coupled with and readable by the one or more processors and having stored therein processor-readable instructions. When executed by the one or more processors the instructions may cause the one or more processors to receive from a plurality of television receivers, television channel usage data indicative of television channels being received by the plurality of television receivers. The television channel usage data may include usage data for television channels being transmitted using a plurality of transponders. The instructions may cause the one or more processors to analyze the television channel usage data to determine a grouping of television channels. The instructions may cause the one or more processors to, based on analyzing the television channel usage data, reassign a television channel from a first transponder to a second transponder for transmission to the plurality of television receivers such that the grouping of television channels are transmitted using the second transponder.

Embodiments of such a system may include one or more of the following: The instructions may cause the one or more processors to create a table that indicates the television channel is assigned to the second transponder for transmission. The instructions may cause the one or more processors to cause the table to be transmitted to each television receiver of the plurality of television receivers. The instructions may cause the one or more processors to cause the television channel to be transmitted to the plurality of television receivers using the second transponder. The processor-readable instructions that, when executed, cause the one or more processors to reassign the television channel from the first transponder to the second transponder may include processor-readable instructions, when executed, cause the one or more processors to cause the television channel to be simulcast using the first transponder and the second transponder for at least a period of time. The second transponder may be on a satellite. A television receiver of the system may be configured to output for presentation an electronic programming guide (EPG) that indicates the grouping of television channels transmitted by the television service provider via the second transponder.

Additionally or alternatively, embodiments of such a system may include one or more of the following: The television receiver may be configured to determine a combination of television channels selected to be recorded concurrently cannot be recorded due to the television channel being reassigned from the first transponder to the second transponder. The television receiver may be configured to transmit an indication of a recording failure to the television service provider based on determining the combination of television channels selected to be recorded concurrently cannot occur due to the second television channel being reassigned from the first transponder. The television receiver being configured to determine the combination of television channels selected to be recorded concurrently cannot be recorded due to the television channel being reassigned from the first transponder to the second transponder may include the television receiver being configured to determine an available number of tuners is less than a number of transponders to which tuning is concurrently required for the combination of television channels to be recorded.

In some embodiments, a method for grouping multiple television channels for recording is presented. The method may include receiving, by a television service provider system, from a plurality of television receivers, television channel usage data indicative of television channels being received by the plurality of television receivers. The television channel usage data may include usage data for television channels being transmitted using a plurality of transponders. The method may include analyzing, by the television service provider system, the television channel usage data to determine a grouping of television channels. The method may include, based on analyzing the television channel usage data, reassigning a television channel from a first transponder to a second transponder for transmission to the plurality of television receivers such that the grouping of television channels are transmitted using the second transponder. The method may include creating, by the television service provider system, a database that indicates the television channel is assigned to the second transponder for transmission. The method may include transmitting, by the television service provider system, the database to each television receiver of the plurality of television receivers. The method may include transmitting, by the television service provider system, the television channel to the plurality of television receivers using the second transponder.

Reassigning the television channel from the first transponder to the second transponder may include simulcasting the television channel using the first transponder and the second transponder for at least a period of time. The second transponder may be on a satellite. The method may include presenting, by a television receiver of the plurality of television receivers, an electronic programming guide (EPG) that indicates the grouping of television channels transmitted by the television service provider via the second transponder. The method may include determining, by the television receiver, a combination of television channels selected to be recorded concurrently cannot be recorded due to the television channel being reassigned from the first transponder to the second transponder. The method may include transmitting, by the television receiver, an indication of a recording failure to the television service provider based on determining the combination of television channels selected to be recorded concurrently cannot occur due to the second television channel being reassigned from the first transponder. Determining the combination of television channels selected to be recorded concurrently cannot be recorded due to the television channel being reassigned from the first transponder to the second transponder may be based on determining, by the television receiver, an available number of tuners is less than a number of transponders to which tuning is concurrently required for the combination of television channels to be recorded.

In some embodiments, a non-transitory processor-readable medium for grouping multiple television channels for recording is presented. The non-transitory processor-readable medium may include processor-readable instructions configured to cause one or more processors to receive from a plurality of television receivers, television channel usage data indicative of television channels being received by the plurality of television receivers. The television channel usage data may include usage data for television channels being transmitted using a plurality of transponders. The instructions may be configured to cause the one or more processors to analyze the television channel usage data to determine a grouping of television channels. The instructions may be configured to cause the one or more processors to, based on analyzing the television channel usage data, reassign a television channel from a first transponder to a second transponder for transmission to the plurality of television receivers such that the grouping of television channels are transmitted using the second transponder. The instructions may be configured to cause the one or more processors to create a table that indicates the television channel is assigned to the second transponder for transmission.

BRIEF DESCRIPTION OF THE DRAWINGS

A further understanding of the embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
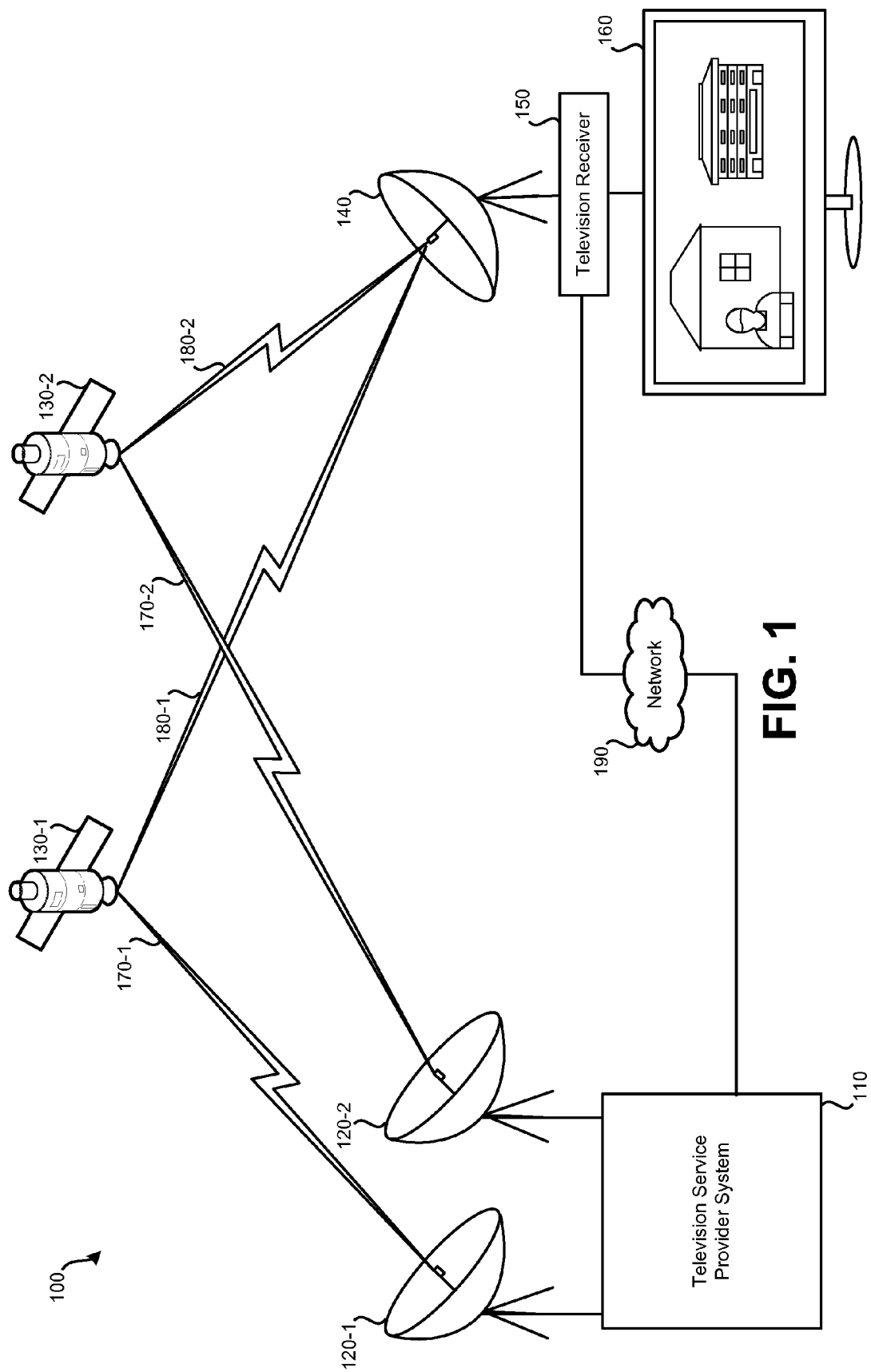
FIG. 1 illustrates an embodiment of a satellite television distribution system.

It may be beneficial for a television receiver to receive, store (record), and/or review multiple television channels simultaneously. For instance, during the evening primetime hours, a television subscriber (referred to as a "user") may want to view and/or store multiple television programs that are being broadcast concurrently on different television channels. In some situations, a user may want to store even greater amounts of programming appearing on multiple television channels simultaneously. For example, a user may desire to store the five most popular television programs being concurrently broadcast. Another situation may occur where a user may want to store and/or view multiple television channels simultaneously, such as while multiple concurrent sporting events are occurring (e.g., football on a Fall Saturday or Sunday, or multiple events of the Olympics being broadcast simultaneously). Another situation may be where the user's favorite television programs happen to be broadcast concurrently on different television channels. Still another example may be in which a user wants to record multiple television programs of the same genre (e.g., reality television) at the same time.

For a user to record (and/or view) multiple television channels simultaneously, television receiver hardware may need to be dedicated to the task. Typically, a single television tuner may be able to tune to one television channel at a time for viewing and/or recording. As such, if the user desired to record four television channels simultaneously, the user's television receiver (e.g., set top box (STB)) may conventionally use a separate tuner to tune to each of the four television channels. However, in certain television distribution arrangements, such as in a satellite television broadcasting arrangement, a single transponder stream may be used to transmit data corresponding to multiple television channels. Since each of these multiple television channels are transmitted using the same transponder (e.g., at the same transmission frequency), a single tuner of a television receiver may be used to concurrently receive the multiple television channels. As such, if a user desires to record four television channels that are being transmitted using the same transponder of a satellite, a single tuner at the user's television receiver may be used for all of the four television channels.

As an example, in a typical arrangement, an television receiver with three tuners may be able to receive, present, and/or record three television channels simultaneously. Regardless of whether some or all of these television channels are received within the same transponder stream, an individual tuner may be devoted to each television channel. As such, multiple tuners may be used to receive the same transponder stream. In embodiments detailed herein, multiple television channels that are present in the same transponder stream may be received using a single tuner of an television receiver. As such, a greater number of television channels may be simultaneously captured if the number of tuners available would otherwise serve as a limiting factor. For example, a single tuner being used to receive a transponder stream having five television channels may be used to receive, present, and/or record each of the five television channels. Other tuners of the television receiver may be used for tuning to other transponder streams for presenting and/or recording of other television channels.

While multiple television channels may be simultaneously received, presented, and/or recorded from the same transponder stream by a single tuner, such an arrangement may not be useful to a user unless multiple television channels that the user desires to record (and/or view) simultaneously are being transmitted from the same transponder using the same transponder stream. In order to maximize the likelihood of a user wanting to record multiple television channels that are being transmitted using a particular transponder stream, a television service provider may want to group television channels into transponder streams according to various metrics. Such television channels may be regrouped periodically, such as once per day or once per week. As an example of the metrics which may be used, television networks may be grouped based on what is popular based on television viewing statistics. Another example may be a "special event" grouping, such as television channels broadcasting Olympic events. Another example may be a sports grouping, such as each television channel that carries an NFL game on Sundays being grouped onto the same transponder. Still another example may be based on genre, such as each television channel that has a reality television show during primetime may be grouped such that each of these television channels are transmitted using the same transponder. Other examples are also possible.

For determining which television channels should be grouped, data may be gathered from television receivers as to the popularity of television programs or the popularity of television channels during certain days at certain times. The most popular television channels for a particular day or week may be grouped such that each of these television channels are transmitted using the same transponder stream. Therefore, if a television receiver is to be used to record multiple of these television channels concurrently, a single tuner of the television receiver may be used to receive each of the television channels, thus leaving other tuners of the television receiver available to tune to other transponder streams for viewing and/or recording of other television channels.

FIG. 1 illustrates an embodiment of a satellite television distribution system 100. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions) instances of user equipment may receive television signals from satellites 130.

Television service provider system 110 and satellite transmitter equipment 120 may be operated by a television service provider. A television service provider may distribute television channels, on-demand programming, programming information, and/or other services to users. Television service provider system 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder stream 180. Satellites 130 may be in geosynchronous orbit. Each satellite 130 may be in a different orbital slot, such that the signal path between each satellite, uplink stations, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite transmitter equipment 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a time.

Figure 2:
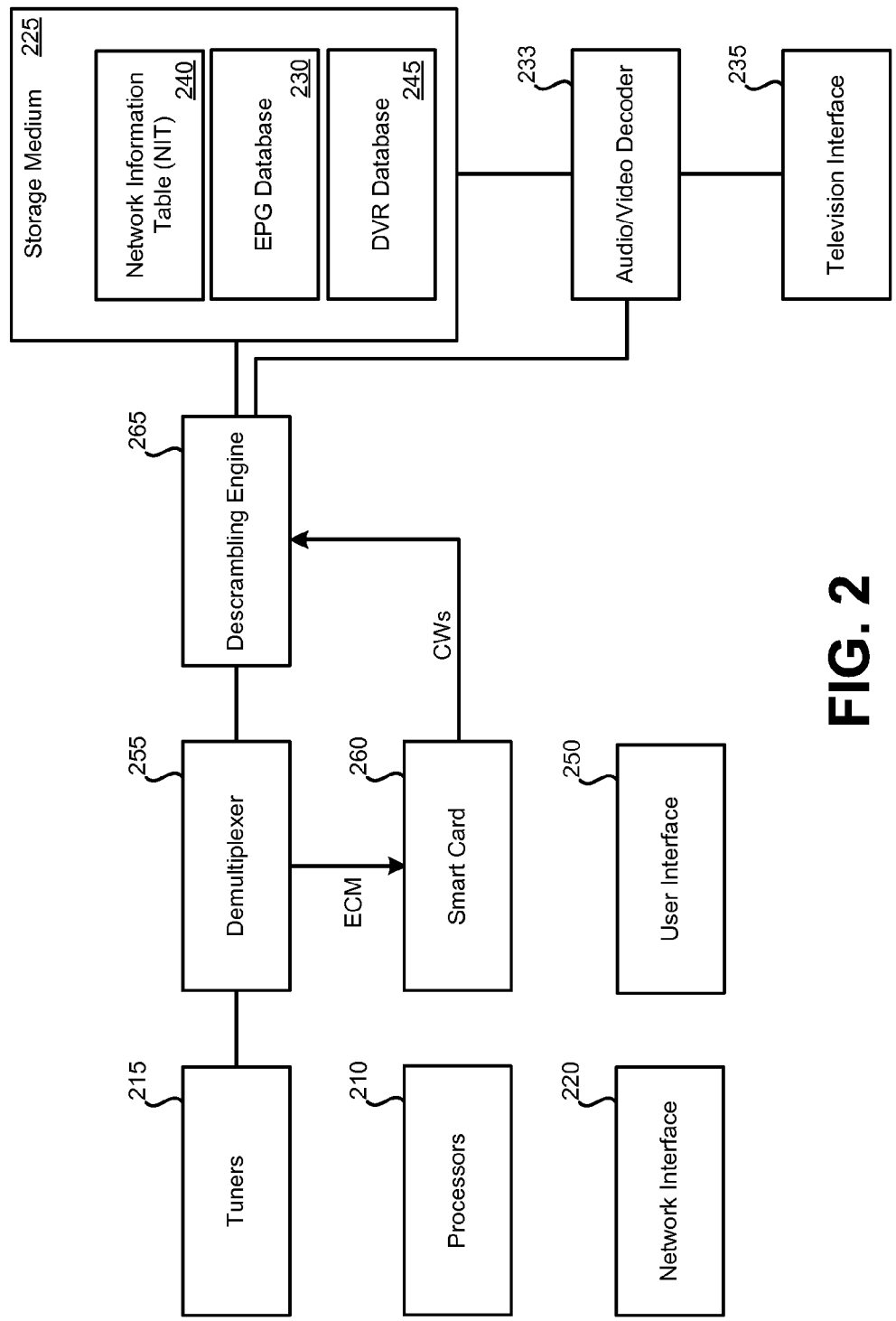
FIG. 2 illustrates an embodiment of a television receiver.

In communication with satellite dish 140, may be one or more sets of receiving equipment. Receiving equipment may be configured to decode signals received from satellites 130 via satellite dish 140 for display on a display device, such as display device 160. Receiving equipment may include satellite dish 140 and television receiver 150. Television receiver 150, may be incorporated as part of a display device (e.g., television) or may be part of a separate device, commonly referred to as a set-top box (STB). Receiving equipment may include a satellite tuner configured to receive television channels via a satellite. In FIG. 1, receiving equipment is present in the form of television receiver 150. As such, television receiver 150 may decode signals received via satellite dish 140 and provide an output to display device 160. FIG. 2 provides additional detail of receiving equipment.

Display device 160 may be used to present video and/or audio decoded by television receiver 150. Television receiver 150 may also output a display of one or more interfaces to display device 160, such as an electronic programming guide (EPG). In some embodiments, display device 160 may be a television, monitor, or other device capable of displaying video.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay 32 transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. television receiver 150 may decode the received transponder stream. As such, depending on which television channel(s) are desired, a transponder stream from a different satellite (or a different transponder of the same satellite) may be accessed and decoded by television receiver 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and television receiver 150. Via such a secondary communication channel, bidirectional exchange of data may occur. As such, data may be transmitted to television service provider system 110 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems.

FIG. 2 illustrates a block diagram of an embodiment of television receiver 200. Television receiver 200 may be television receiver 150 of FIG. 1, or may be incorporated as part of a television, such as display device 160 of FIG. 1. Television receiver 200 may include: processors 210, tuners 215, network interface 220, non-transitory computer-readable storage medium 225, electronic programming guide (EPG) 230, television interface 235, networking information table (NIT) 240, digital video recorder (DVR) 245, user interface 250, demultiplexer 255, smart card 260, and/or descrambling engine 265. In other embodiments of television receiver 200, fewer or greater numbers of components may be present. It should be understood that the various components of television receiver 200 may be implemented using hardware, firmware, software, and/or some combination thereof. For example, an EPG may be created based on information from EPG database 230 may be executed by processors 210.

FIG. 2 illustrates an embodiment of television receiver 200, which may typically be in the form of a separate device configured to be connected with a presentation device, such as a television. Embodiments of television receiver 200 may also be referred to as a "television receiver." In addition to being in the form of an television receiver, a television receiver may be incorporated into another device, such as a television. For example, a television may have an integrated television receiver (which does not involve an external STB being coupled with the television). A television receiver may contain some or all of the components of television receiver 200 and/or may be able to perform some or all of the functions of television receiver 200. Accordingly, instances in this document referring to an television receiver and steps being performed by an television receiver may also be performed, more generally, by a television receiver.

Processors 210 may include one or more general-purpose processors configured to perform processes such as tuning to a particular channel, displaying the EPG, and/or receiving and processing input from a user. Processors 210 may include one or more special purpose processors. For example, processors 210 may include one or more processors dedicated to decoding video signals from a particular format, such as MPEG, for output and display on a television and for performing descrambling. It should be understood that the functions performed by various modules of FIG. 2 may be performed using one or more processors. As such, for example, functions of descrambling engine 265 may be performed by processor 210.

Tuners 215 may include one or more tuners used to tune to television channels, such as television channels transmitted via satellite or cable. Each tuner contained in tuners 215 may be capable of receiving and processing a single stream of data from a satellite transponder (or a cable RF channel) at a given time. As such, a single tuner may tune to a single transponder (or cable RF channel). If tuners 215 include multiple tuners, one tuner may be used to tune to a television channel on a first transponder for display using a television, while another tuner may be used to tune to a television channel on a second transponder for recording and viewing at some other time. Still another tuner may be used to check various television channels to determine if they are available or not. If multiple television channels transmitted on the same transponder stream are desired, a single tuner of tuners 215 may be used to receive the signal containing the multiple television channels for presentation and/or recording.

Network interface 220 may be used to communicate via an alternate communication channel with a television service provider. For example, the primary communication channel may be via satellite (which may be unidirectional to the television receiver) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220.

Storage medium 225 may represent a non-transitory computer readable storage medium. Storage medium 225 may include memory and/or a hard drive. Storage medium 225 may be used to store information received from one or more satellites and/or information received via network interface 220. Storage medium 225 may store information related to EPG database 230, NIT 240, and/or DVR database 245. Recorded television programs may be stored using storage medium 225.

EPG database 230 may store information related to television channels and the timing of programs appearing on such television channels. EPG database 230 may be stored using storage medium 225, which may be a hard drive. EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording to DVR database 245. Information used to populate EPG database 230 may be received via network interface 220 and/or via satellites, such as satellites 130 of FIG. 1 via tuners 215. For instance, updates to EPG database 230 may be received periodically via satellite. Information from EPG database 230 may serve as an interface for a user to control DVR functionality of television receiver 200 to enable viewing and/or recording of multiple television channels simultaneously.

Audio/video decoder 233 may serve to convert encoded video and audio into a format suitable for output to a display device. For instance, audio/video decoder 233 may receive MPEG video and audio from storage medium 225 or descrambling engine 265 to be output to a television. Audio/video decoder 233 may convert the MPEG video and audio into a format appropriate to be displayed by a television or other form of display device and audio into a format appropriate to be output from speakers, respectively.

Television interface 235 may serve to output a signal to a television (or another form of display device) in a proper format for display of video and playback of audio. As such, television interface 235 may output one or more television channels, stored television programming from storage medium 225 (e.g., DVR database 245 and/or information from EPG database 230) to a television for presentation.

The network information table (NIT) 240 may store information used by television receiver 200 to access various television channels. NIT 240 may be stored using storage medium 225. Information used to populate NIT 240 may be received via satellite (or cable) through tuners 215 and/or may be received via network interface 220 from the television service provider. As such, information present in NIT 240 may be periodically updated. NIT 240 may be locally-stored by television receiver 200 using storage medium 225. Information that may be present in NIT 240 may include: television channel numbers, a satellite identifier, a frequency identifier, a transponder identifier, an ECM PID, one or more audio PIDs, and a video PID. (A second audio PID of a channel may correspond to a second audio program (SAP), such as in another language.) In some embodiments, NIT 240 may be divided into additional tables. For example, rather than the specific audio PIDs and video PIDs being present in NIT 240, a channel identifier may be present within NIT 240 which may be used to lookup the audio PIDs and video PIDs in another table. It should be understood that the data indicated as stored by an NIT may be stored within a table or database of another name and/or may be spread across multiple databases and/or tables.

Table 1 provides a simplified example of NIT 240 for several television channels. It should be understood that in other embodiments, many more television channels may be represented in NIT 240. NIT 240 may be periodically updated by a television service provider. As such, television channels may be reassigned to different satellites and/or transponders, and television receiver 200 may be able to handle this reassignment as long as NIT 240 is updated.

TABLE 1

| Channel | Satellite | Transponder | ECM PID | Audio PIDs | Video PID |
|---------|-----------|-------------|---------|------------|-----------|
| 4       | 1         | 2           | 27      | 1001       | 1011      |
| 5       | 2         | 11          | 29      | 1002       | 1012      |
| 7       | 3         | 3           | 31      | 1003       | 1013      |
| 13      | 3         | 4           | 33      | 1003, 1004 | 1013      |

It should be understood that the values provided in Table 1 are for example purposes only. Actual values, including how satellites and transponders are identified, may vary. Additional information may also be stored in NIT 240. Additional information on how NIT 240, as indicated in Table 1, may be used is provided in reference to FIG. 3. Video and/or audio for different television channels on different transponders may have the same PIDs. Such television channels may be differentiated based on which satellite and/or transponder to which a tuner is tuned.

Digital Video Recorder (DVR) 245 may permit a television channel to be recorded for a period of time. DVR database 245 may store timers that are used by processors 210 to determine when a television channel should be tuned to and recorded to DVR database 245 of storage medium 225. In some embodiments, a limited amount of storage medium 225 may be devoted to DVR database 245. Timers may be set by the television service provider and/or one or more users of the television receiver. DVR database 245 may be configured by a user to record particular television programs. Whether a user directly tunes to a television channel or television receiver 200 tunes to a first television channel to record a television program in accordance with a timer, NIT 240 may be used to determine the satellite, transponder, ECM PID (packet identifier), audio PID, and video PID. (In some embodiments, such information is dispersed among multiple tables/databases rather than being present in a single table.)

User interface 250 may include a remote control (physically separate from television receiver 200) and/or one or more button on television receiver 200 that allows a user to interact with television receiver 200. User interface 250 may be used to select a television channel for viewing, view information from EPG database 230, and/or create and store a timer to DVR database 245.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which in combination with NIT 240, can be determined to be associated with particular television channel. Particular data packets, referred to as entitlement control messages (ECMs) may be periodically transmitted. ECMs may be encrypted; television receiver 200 may use smart card 260 to decrypt ECMs. Decryption of an ECM may only be possible if the user has authorization to access the particular television channel associated with the ECM. When an ECM is received by demultiplexer 255 and the ECM is determined to correspond to a television channel being stored and/or displayed, the ECM may be provided to smart card 260 for decryption.

When smart card 260 receives an encrypted ECM from demultiplexer 255, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260.

When an ECM is received by smart card 260, it may take a period of time for the ECM to be decrypted to obtain the control words. As such, a period of time, such as 2 seconds, may elapse before the control words indicated by the ECM can be obtained. Smart card 260 may be permanently part of television receiver 200 or maybe configured to be inserted and removed from television receiver 200.

Demultiplexer 255 may be configured to filter data packets based on PIDs. For example, if a transponder data stream includes multiple television channels, data packets corresponding to a television channel that is not desired to be stored or displayed by the user, may be ignored by demultiplexer 255. As such, only data packets corresponding to the one or more television channels desired to be stored and/or displayed may be passed to either descrambling engine 265 or smart card 260, other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to NIT 240, may be appropriately routed by demultiplexer 255.

Descrambling engine 265 may use the control words output by smart card 260 in order to decrypt video and/or audio corresponding to television channels for storage and/or presentation. Video and/or audio data contained in the transponder data stream received by tuners 215 may be scrambled. The video and/or audio may be decrypted by descrambling engine 265 using a particular control word. Which control word output by smart card 260 to be used for successful decryption may be indicated by a scramble control identifier present within the data packet containing the scrambled video or audio. Decrypted video and/or audio may be output by descrambling engine 265 to storage medium 225 for storage (via DVR database 245) and/or to audio/video decoder 233 for output to a television or other presentation equipment via television interface 235.

For simplicity, television receiver 200 of FIG. 2 has been reduced to a block diagram, commonly known parts, such as a power supply, have been omitted. Further, some routing between the various modules of television receiver 200 has been illustrated. Such illustrations are for exemplary purposes only. Two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Also, while television receiver 200 may be used to receive, store, and present television channels received via a satellite, it should be understood that similar components may be used to receive, store, and present television channels via a cable network.

Figure 3:
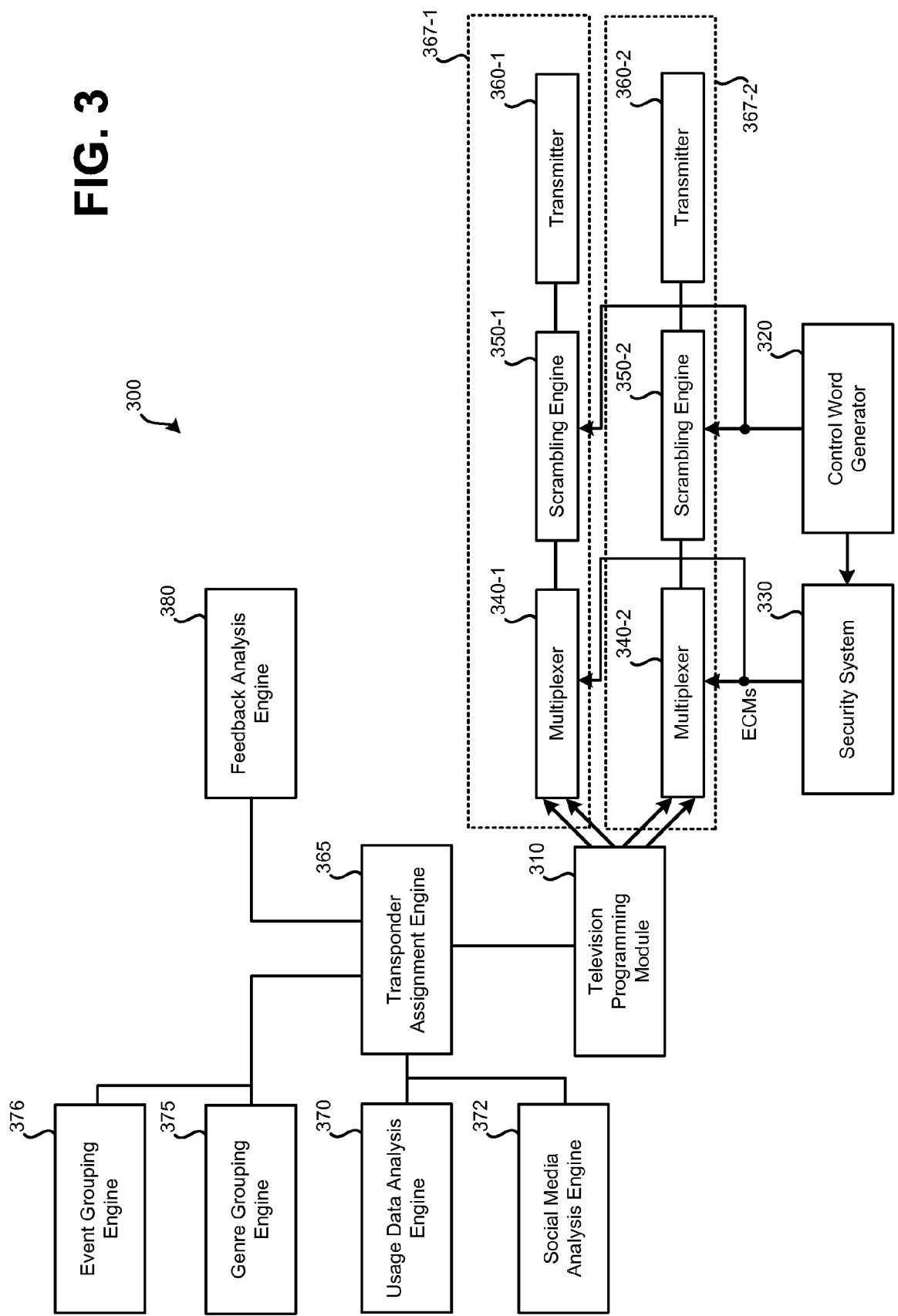
FIG. 3 illustrates an embodiment of a television service provider system.

FIG. 3 illustrates an embodiment of a television service provider system 300. Television service provider system 300 may be part of television service provider system 110 of FIG. 1. As such, before data is transmitted to television receivers via satellite, television service provider system 300 may be used to group television channels into particular transponder streams for transmission. Television service provider system 300 may include: television programming module 310, control word generator 320, security system 330, multiplexers 340, scrambling engines 350, transmitters 360, transponder assignment engine 365, usage data analysis engine 370, genre grouping engine 375, social media analysis engine 372, and feedback analysis engine 380.

Television programming module 310 may receive television channels from multiple different sources, such as directly from the networks that produced the content on the television channels. Each television channel that is to be transmitted on a particular transponder stream via a transponder of the satellite may be provided to multiplexers 340. Multiplexers 340 may create streams of data packets containing the video, audio, and other data, such as ECMs, to be transmitted as a transponder data stream via transponders (e.g., of a satellite) to user equipment. Each multiplexer of multiplexers 340 may be associated with a particular transponder stream. Each transponder stream, which may include video and/or audio data packets that are not scrambled, may be passed to scrambling engines 350. Scrambling engines 350 may use a control word to scramble video or audio present in a data packet. Multiple television channels that are to be transmitted using the same transponder stream may be multiplexed by a multiplexer into a single transponder stream. For example, multiplexer 340-1 may multiplex two or more television channels that are to be scrambled by scrambling engine 350-1 and transmitted by transmitter 360-1 via a first transponder stream; multiplexer 340-2 may multiplex two or more other television channels that are to be scrambled by scrambling engine 350-2 and transmitted by transmitter 360-2 via a second transponder stream. Television channels may be reassigned between transponder streams by changing which television channels are provided to which transponder stream creation module of transponder stream creation modules 367. While two transponder stream creation modules 367 are shown, it should be understood that more of such modules may be present in other embodiments.

Control word generator 320 may generate the control word that is used by scrambling engines 350 to scramble the video or audio present in the data packet. Control words generated by control word generator 320 may be passed to security system 330, which may be operated by the television service provider or by a third-party security provider. The control words generated by control word generator 320 may be used by security system 330 to generate an ECM. Each ECM may indicate two control words. The control words indicated may be the current control word being used to scramble video and audio, and the control word that will next be used to scramble video and audio. Security system 330 may output an ECM to multiplexers 340 for transmission to subscribers' television receivers. Each data packet, whether it contains audio, video, an ECM, or some other form of data, may be associated with a particular PID. This PID may be used by the television receiver in combination with the networking information table to determine which television channel the data contained within the data packet corresponds. After video and audio contained within data packets has been scrambled by scrambling engines 350, the transponder data stream may be transmitted by transmitters 360 to a satellite, such as satellite 130-1 of FIG. 1, for relay to subscribers' television receivers, such as television receiver 150. Accordingly, the transponder data stream transmitted by transmitter 360-1 contains scrambled video packet stream and audio packet stream and also contains an encrypted ECM packet stream which contains the control words necessary to descramble the scrambled video and audio packets. Transmitter 360-1 may transmit a transponder stream to a satellite for relay to television receivers, while transmitter 360-2 may transmit a transponder stream for transmission to television receivers via a different transponder of the same satellite or via a different transponder of a different satellite.

Transponder assignment engine 365 may assign television channels to various transponder streams. Based on a transponder stream assignment created by transponder assignment engine 365, one or more television channels may be reassigned from one transponder stream to another transponder stream. Such transponder assignments may be output to multiplexers 340 and/or television programming module 310 to adjust which transponder stream various television channels are transmitted in by transmitter 360.

Transponder assignment engine 365, in addition to reassigning television channels between transponders, may create network information tables (NITs) (or some other database/table data storage arrangement) for transmission to television receivers. A new NIT (or some other database/table data storage arrangement) may indicate the reassignment of one or more television channels from a first transponder to a second transponder. Such new network information tables may need to be provided to television receivers to permit the television receivers to tune to the television channels that have been reassigned to different transponders. In some embodiments, a new network information table is transmitted periodically, such as once per day. Modifications to a NIT may be transmitted at night to minimize disruption to television viewers.

Which transponder stream various television channels are assigned to may be based on various metrics provided to transponder assignment engine 365. In some embodiments, one or more transponder streams are determined based on viewing popularity. As such, for a given time period, such as the previous day or previous week, the most popular television channels may be assigned to a particular transponder and transponder stream. It may be expected that since these television channels are the most popular, a significant number of users may want to record multiple of these television channels simultaneously. By grouping the most popular television channels onto a single transponder, the number of tuners needing to be devoted to recording the most popular television channels simultaneously at the television receiver of the user may be decreased.

If one of the metrics used to determine which transponder a television channel should be assigned to by transponder assignment engine 365 is popularity, popularity information may be derived from usage data analysis engine 370. Usage data analysis engine 370 may be configured to collect usage data from multiple television receivers. Referring to FIG. 1, a television receiver, such as television receiver 150, may transmit usage information to television service provider system 110 via network 190. Such information may be collected from multiple television receivers in order to assess which television programs and/or what television channels are most popular over various periods of time, such as on a day-to-day basis or week to week basis. Accordingly, television receivers transmitting usage data may indicate time periods for which the television receiver was tuned to a particular television channel. Such usage data may be anonymous.

Usage data analysis engine 370 may receive usage data from multiple television receivers. This usage data may be compiled in order to determine the most popular television channels for a particular period of time, such as the previous week. This usage data may then be used by transponder assignment engine 365 to determine how television channels should be grouped within transponder streams for transmission to television receivers. In some embodiments, a particular transponder stream may be used to transmit the major networks, such as ABC, CBS, NBC, and FOX, to television receivers. A second transponder stream may be used to transmit each of the most popular television channels for the previous week exclusive of the major networks to television receivers. Therefore, if one or more of the most popular television channels happens to be one of the major networks, the television channel may not be simulcast on the second transponder. In some embodiments, as an example, even if one transponder is dedicated to transmitting all of the major networks, the transponder stream that contains the most popular television channels may also transmit (simulcast) one or more of the major networks if such networks are determined to be the most popular.

Table 2 provides an example of how reassignment may occur based on popularity. Based on usage data, television channels may be reassigned between transponders so that a particular transponder has the most popular television channels for a given time period. Viewership is in thousands of households.

TABLE 2

| Television Channel | Week 1 Viewership | Week 2 Viewership |
| --- | --- | --- |
| 1 | 23.1 | 21.1 |
| 2 | 17.3 | 22.4 |
| 3 | 27.5 | 13.6 |
| 4 | 18.2 | 22.6 |
| 5 | 8.7 | 14.5 |
| 6 | 18.4 | 18.3 |
| 7 | 21.3 | 25.3 |

The usage data of Table 2 may be gathered from television receivers by usage data analysis engine 370. Assume, for the purposes of the example, that each transponder may carry three television channels. As such, following week 1, a transponder stream that is based on popularity may include channels 3, 1, and 7. Following week two, the transponder stream may be modified to include channels 2, 4, and 7. As such, the most popular channels from the previous week are present in the transponder stream.

Additionally or alternatively, other metrics may be used besides popularity for grouping television channels onto a transponder. For example, grouping may occur based on the genre. Genre grouping engine 375 may be used to assess the predominant genre of television programs present on a television channel. Genre grouping engine 375 may be configured to use a particular period of time in assessing the genre of a television channel, such as prime time. For the purposes of grouping by genre, if a television channel transmits a sports program during prime time, the television channel may be classified, at least for that time period, as a sports channel. For example, television channel genres may include: news, shopping, sports, reality TV, sitcoms, talent shows, documentary, music, etc. Therefore, for a given time period, such as a day or a week, television channels may be grouped based on genre. A particular transponder stream may have television channels that each carry reality programming. After the given time period, the television channels may be reassigned based on the genre of the television programming previously shown or scheduled to be shown. In some embodiments, genre grouping engine 375 may frequently cause reassignment of television channels based on the genre of the television programs currently being shown. For example, every hour, the assignment of television channels to transponders may be reassigned based on the genre of the television channel's scheduled programming.

Functioning similarly to genre grouping engine may be event grouping engine 376. Special events may be desired to each be transmitted using a particular transponder such that if a user desires to record all television programming related to the event, such recording may be more likely to be possible. For example, an "Olympics" special event may be created that groups television channels presenting programming related to the Olympics on the same transponder. Other such special events may include election coverage, sporting events, etc.

Operation of event grouping engine 376 and genre grouping engine 375 may be automated such that based on the programming, television channels are grouped according to genre and/or event by a computer system. In some embodiments, an administrator may provide input indicating how television stations should be grouped. Transponder assignment engine 365, whether the groupings are indicated by an administrator or computer system, may then assign each television channel to a transponder based on the indicated groupings.

In addition or in alternate to usage data or genre information being used to group television channels onto a particular transponder, data captured from social media, such as FACEBOOK or TWITTER may be used to assess the popularity of television channels. While usage data may be useful in determining what television channels were popular last week (or some other earlier time period), social media data may be useful in determining what is likely to be popular in the future. For example, if a particular television program is "tweeted" about by many persons, it may be expected that at least during that television program's timeslot, the corresponding television channel is expected to be popular.

In some embodiments, usage data analysis engine 370 may also gather DVR settings from television receivers. The likely popularity of a television channel may be determined based on how many television receivers have a timer set to record the television channel for one or more times in the future. The greater number of timers set for a particular television channel, the higher the popularity of the television channel. In such embodiments, such timer data may be used to predict the popularity of various television channels.

Data gathered from DVR timers, television receivers, and/or social media may be useful in determining trending data related to the popularity of particular television channels. For instance, if over the course of several weeks, a timeslot or a particular television program on a television channels is steadily becoming more popular, this trend may be used to predict the popularity into the future. As such, trending data may be used to determine what channels are likely going to be desired to be recorded simultaneously by subscribers.

In some embodiments, a user may be able to submit suggestions of television channels that the user may want to record simultaneously. For example, an interface via the television receiver may allow a user to request that the television service provider group particular television channels for simultaneous recording. Such data may be analyzed and factored into a decision by the television service provider as to which television channels to group together in a transponder stream.

In addition to the genre information provided by a genre grouping engine 375 or usage data provided by usage data analysis engine 370, transponder assignment engine 365 may use other factors in determining which television channels are included in transponder streams. For example, feedback received from one or more television receivers may be used in determining whether television channels have been grouped into transponder streams in a way that is not beneficial to subscribers. Feedback analysis engine 380 may receive data from one or more television receivers. This feedback may indicate situations where a user has attempted to record multiple television channels concurrently (possibly using a single tuner), but is unable to do so (referred to as "negative feedback"). The user may be unable to concurrently record multiple television channels due to the reassignment of one or more television channels among transponders. As an example of this, while reassigning a particular television channel from a first transponder to a second transponder may result in many users being able to record multiple desired television channels concurrently using a single tuner, for some number of television subscribers this same reassignment may result in multiple tuners being required for recording, whereas previously only one tuner was required. This may be more likely to occur if a user is attempting to record a popular television channel and a less popular television channel simultaneously, since these channels may be transmitted on different transponder streams.

If negative feedback is received from a significant number of television receivers by feedback analysis engine 380, assignment of television channels to transponder streams may be readjusted in order to minimize impact on users. Additionally or alternatively, the feedback received by feedback analysis engine 380 may be used for customer service reasons, such as to explain to subscribers why previously they were able to record multiple television channels using the single tuner but are not currently able to do so.

For simplicity, television service provider system 300 of FIG. 3 has been reduced to a block diagram, other common components have been omitted. Further, some routing between the various modules of television service provider system 300 has been illustrated. Such illustration is for exemplary purposes only. Regardless of whether two modules are directly or indirectly connected, the modules may be able to communicate. Connections between modules are intended only to indicate possible common routing. It should be understood that the modules of television service provider system 300 may be combined into a fewer number of modules or divided into a greater number of modules.

Figure 4:
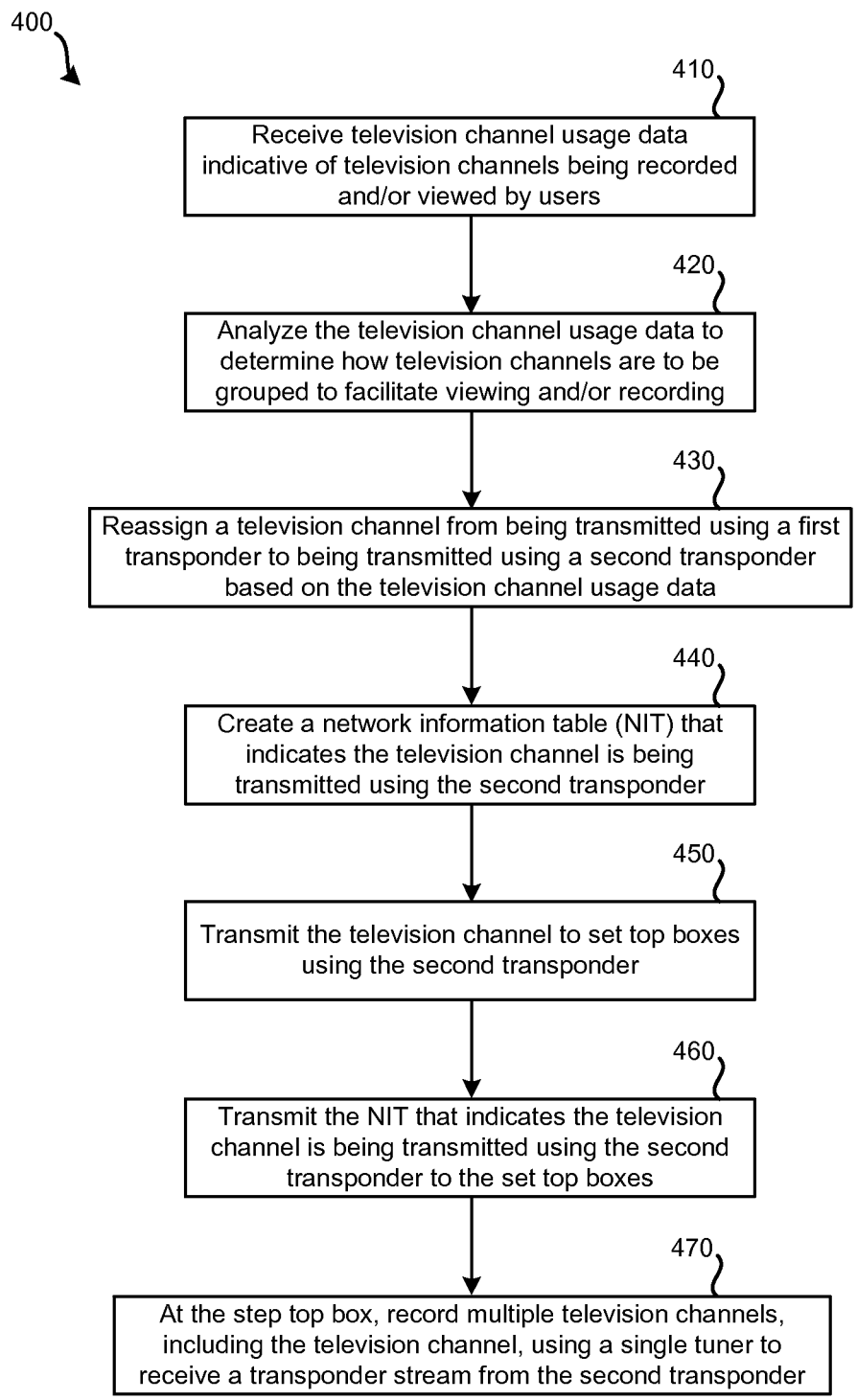
FIG. 4 illustrates an embodiment of a method for grouping multiple television channels to facilitate recording.

Various methods may be performed using the systems described in relation to FIGS. 1-3. FIG. 4 illustrates an embodiment of a method 400 for grouping multiple television channels into a single transponder stream to facilitate recording using a single tuner at a television receiver. Method 400 may be performed using television service provider system 300 of FIG. 3. Method 400 may also involve the user of satellite television distribution system 100 of FIG. 1 and television receiver 200 of FIG. 2. It should be understood that method 400 may be performed using other embodiments of satellite (or cable) television distribution systems, television receivers (or other forms of user equipment), and television service provider systems. Means for performing method 400 include television service provider systems, television receivers, television distribution systems, and computerized devices, such as computer system 700 of FIG. 7.

At step 410, television channel usage data indicative of television channels being decoded (for recording and/or viewing) by television receivers may be received by the television service provider. Such television channel usage data may be received by a computer system of the television service provider and may be used to determine the popularity of particular television channels during various time periods. While each subscriber of a television service provider may use a television receiver to receive, decode, store, and present television channels, only some of these television receivers may provide usage data. As such, a percentage of the total television receivers in use may provide feedback which is used as a sample of the subscribers of the television service provider.

At step 420, the received television channel usage data may be analyzed by a usage data analysis engine of the television service provider to determine how television channels should be grouped to facilitate viewing and/or recording by television receivers. The received television channel usage data may be analyzed for a particular metric, such as popularity. The most popular television channels may be grouped onto a single transponder. Additional metrics may also be used to determine how television channels should be grouped into transponder streams. For example, a transponder stream may be dedicated to all of the major networks. These television channels may be excluded from a determination of the most popular television channels because these television channels have already been assigned to a particular transponder stream.

In addition to analyzing television channel usage data, information from other sources may also be used to determine how television channels should be grouped. For example, data derived from social networks may be used to determine what television channels are likely to be popular over a given period of time. As an example of this, consider a new television series debuting on a particular television channel. While previous usage data may not be available because the television program has not debuted yet, based on a large amount of "likes" or "tags," the likely popularity of the television channel may be estimated. As such, the computer system of the television service provider performing step 420, may analyze data collected from social media networks in addition to usage data collected from television receivers at step 410.

Analyzing the popularity of various television channels may occur over set periods of time. For example, the most popular television channels may be determined on a daily or weekly basis. The period of time over which popularity is assessed may be based on the frequency at which the television service provider desires to reassign television channels among transponder streams. If the television service provider plans on moving television channels between transponder streams on a weekly basis, popularity may be assessed on a weekly basis.

At step 430, a television channel that is being transmitted using the first transponder (on a first transponder stream) may be reassigned such that it is transmitted using a second transponder (on a second transponder stream). For a satellite television distribution network, this second transponder may be present on the same satellite or a different satellite. The reassignment of this television channel may be based on the television channel usage data collected at step 410 and analyzed step 420. Additionally or alternatively, the reassignment of the television channel may be based on data collected from one or more social networks at step 420. While step 430 focuses on the reassignment of one television channel, it should be understood that multiple television channels may be reassigned at the same time. For example, if three of the five most popular television channels changed over the previous week, these three television channels may be moved to a particular transponder and transponder stream.

Prior to, at the same time, or after the television channel has been reassigned to a second transponder, the network information table (NIT) (or some other database/table data storage arrangement) at each television receiver that is configured to receive the television channel may be updated. To do this, a modified NIT (or some other database/table data storage arrangement) may be created by the television service provider system at step 440. The modified network information table may indicate that the television channel is now assigned to the second transponder. If other television channels have been moved to different transponders, such modifications may also be indicated in the modified NIT.

At step 450, the television channel may be transmitted to users television receivers, such as using a satellite television distribution network, using the second transponder. The television channel may cease being transmitted using the first transponder. In some embodiments, the television channel may be transmitted for a period of time using both the first transponder and the second transponder via simulcast. As such, if a television receiver is tuned to the first transponder to receive the television channel and the television receiver does not immediately receive or process the modified NIT, the television receiver may be able to continue receiving the television channel via the first transponder stream for a period of time. At step 460, the NIT (or some other database/table data storage arrangement) created at step 440 may be transmitted to the television receivers. In a satellite television distribution network, the new NIT may be transmitted via satellite to the users' television receivers. Upon receiving the modified NIT, or a short time thereafter, each television receiver may tune to satellites and transponders of the satellites based on the assignments present within the modified NIT. As such, to receive the television channel, a television receiver may tune to the second transponder (and thus the transponder stream associated with the second transponder). In some embodiments, when the television channel is transmitted to the television receivers using the second transponder, the modified NIT is transmitted concurrently. In some embodiments, the modified NIT may be transmitted before the television channel is reassigned to the second transponder. In such embodiments, the modified NIT may be provided a trigger time and/or date at which time the modified NIT takes effect. As such, when the television channel begins being transmitted using the second transponder, the modified NIT may be triggered to take effect based on the time and/or date.

At step 470, at a television receiver, multiple television channels may be recorded (and/or presented) concurrently. The television channel, which was reassigned from the first transponder to the second transponder, may be one of the multiple television channels being recorded (and/or presented). Since the multiple television channels are transmitted using a single transponder (and thus are on the same transponder stream), a single tuner at the television receiver may be used to receive the multiple television channels concurrently. As such, if multiple television channels are desired to be recorded simultaneously that are transmitted using the second transponder, only a single tuner at the television receiver may be necessary in order to receive, present, and/or store the multiple television channels. Such an arrangement may leave other tuners (if any) of the television receiver available to tune to other transponders streams.

Figure 5:
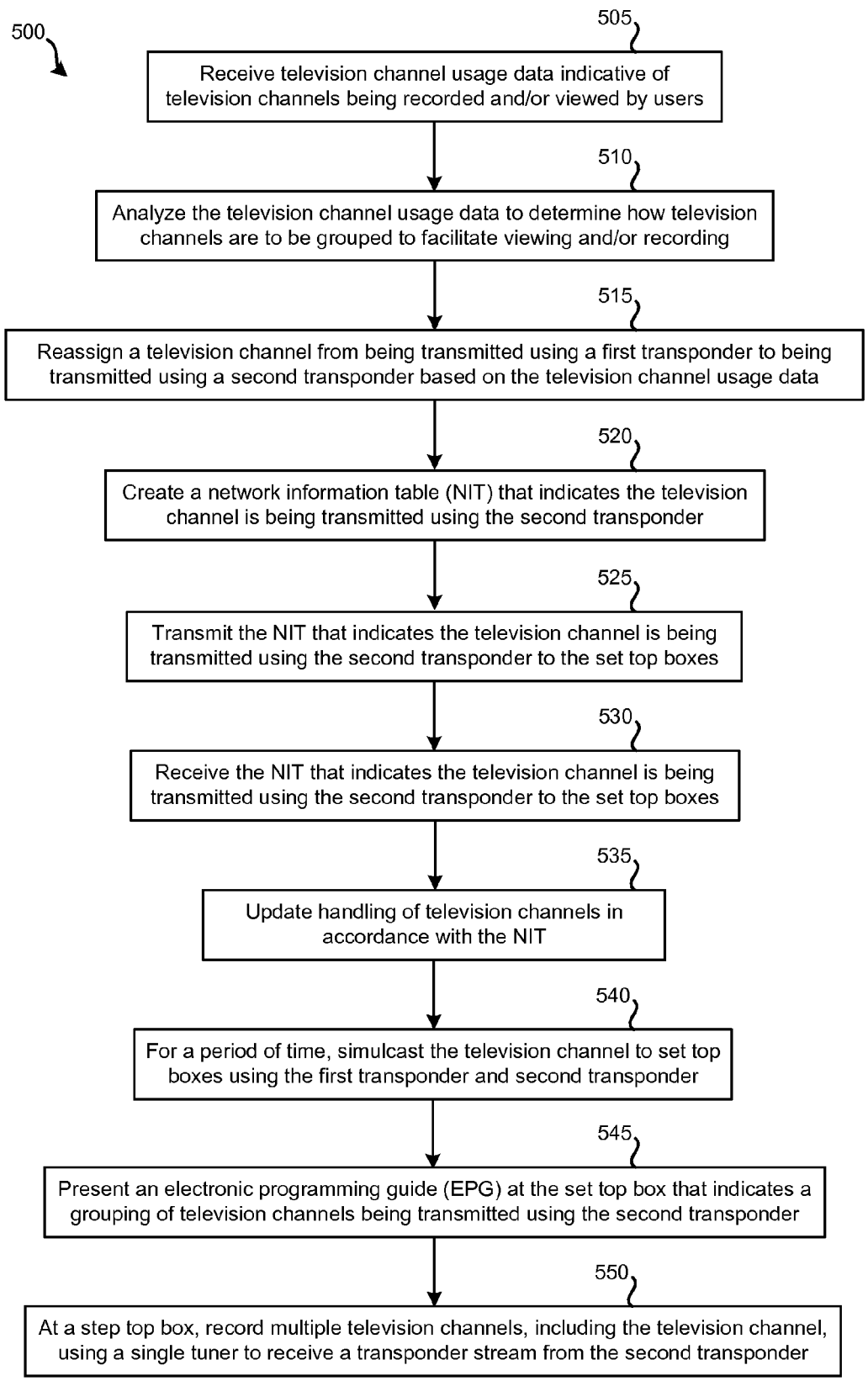
FIG. 5 illustrates another embodiment of a method for grouping multiple television channels to facilitate recording.

FIG. 5 illustrates an embodiment of a method 500 for grouping multiple television channels onto a transponder stream to facilitate recording. Method 500 may be performed using television service provider system 300 of FIG. 3. Method 500 may also involve the user of satellite television distribution system 100 of FIG. 1 and/or television receiver 200 of FIG. 2. It should be understood that method 500 may be performed using other embodiments of satellite (or cable) television distribution systems, television receivers (or other forms of television service receivers), and television service provider systems. Means for performing method 500 include television service provider systems, television receivers, television distribution systems, and computerized devices, such as computer system 700 of FIG. 7. Method 500 may represent a more detailed embodiment of method 400 of FIG. 4.

At step 505, television channel usage data indicative of television channels being received (for recording and/or viewing) by television receivers may be received by the television service provider. Such television channel usage data may be received by a computer system of the television service provider and may be used to determine the popularity of particular television channels during various time periods. While each subscriber of a television service provider may use a television receiver to receive, decode, store, and present television channels, only some of these television receivers may provide usage data. As such, a percentage of the total television receivers in use may provide feedback which is used to represent all of the subscribers of the television service provider.

At step 510, the received television channel usage data may be analyzed by the television service provider system to determine how television channels should be grouped on transponder streams to facilitate viewing and/or recording by television receivers. Referring to FIG. 3, usage data analysis engine 370 may aggregate and analyze usage data on television channels received (for recording or viewing) by television receivers. The received television channel usage data may be analyzed for a particular metric, such as popularity. The most popular television channels may be grouped onto a single transponder. Additional metrics may also be used to determine how television channels should be grouped into a transponder stream. For example, a transponder stream may be dedicated to all of the major networks. These television channels may be excluded from a determination of the most popular television channels because these television channels have already been assigned to a particular transponder stream. In other embodiments, if assigned to a particular transponder stream, a television channel may also be simulcast using another transponder stream.

In addition to analyzing television channel usage data, information from other sources may also be used to determine how television channels should be grouped. For example, data derived from social networks may be used to determine what television channels are likely to be popular over a given period of time. As an example of this, consider a new television series debuting on a particular television channel. While previous usage data may not be available because the television program has not debuted yet, based on a large amount of "likes" or "tags," the likely popularity of the television channel may be estimated. As such, the computer system of the television service provider performing step 510, may analyze data collected from social media networks in addition to usage data collected from television receivers at step 505.

Analyzing the popularity of various television channels may occur over set periods of time. For example, the most popular television channels may be determined on a daily or weekly basis. The period of time over which popularity is assessed may be based on the frequency at which the television service provider is going to reassign television channels between satellite or cable transponders and transponder streams. As an example, if the television service provider only plans on moving television channels between transponder streams weekly, popularity may be assessed on a weekly basis.

At step 515, a television channel that is being transmitted using the first transponder (on a first transponder stream) may be reassigned such that it is transmitted using a second transponder (using a second transponder stream) by the television service provider system. Referring to FIG. 3, transponder assignment engine 365 may handle reassignment of television channels between transponders. For a satellite television distribution network, this second transponder may be present on the same satellite or a different satellite. The reassignment of this television channel may be based on the television channel usage data collected at step 505 and analyzed at step 510. Additionally or alternatively, the reassignment of the television channel may be based on data collected from one or more social networks at step 510. While step 515 focuses on the reassignment of one television channel, it should be understood that multiple television channels may be reassigned at the same time. For example, if three of the five most popular television channels changed over the previous week, these three television channels may be moved to a particular transponder and transponder stream.

Prior to, at the same time, or after the television channel has been reassigned to a second transponder, the network information table (NIT) (or some other database/table data storage arrangement) at each television receiver that is configured to receive the television channel may need to be updated by the television service provider system. To do this, a modified NIT (or some other database/table data storage arrangement) may be created by the television service provider system at step 520. The modified network information table may indicate that the television channel is now assigned to the second transponder. If other television channels have been moved to different transponders, such modifications may also be included in the modified NIT.

At step 540, the television channel may be transmitted for a period of time using both the first transponder and the second transponder via simulcast by the television service provider system. Therefore, two transponder streams may contain the television channel. If a television receiver is tuned to the first transponder to receive the television channel and the television receiver does not immediately receive or process the modified NIT, the television receiver may be able to continue receiving the television channel via the first transponder. Such simulcasting may continue by the television service provider for a predetermined period of time, such as 15 minutes. After the predefined period of time, it may be expected that the majority of television receivers would have received and processed the modified NIT and would not be tuned to the first transponder stream for the television channel. Following the predefined period of time, the television channel may remain transmitted to television receivers via only the second transponder (and the second transponder stream).

At step 525, the NIT (or some other database/table data storage arrangement) created at step 520 may be transmitted to the television receivers by the television service provider system. In a satellite television distribution network, the new NIT may be transmitted via satellite to the television receivers. Upon receiving the new NIT, or short time thereafter, each television receiver may tune to satellites and transponders of the satellite based on the assignments present within the NIT. As such, to receive the television channel, a television receiver may tune to the second transponder (and thus the transponder stream associated with the second transponder). In some embodiments, when the television channel is transmitted to the television receivers using the second transponder, the new NIT is transmitted concurrently. In some embodiments, the new NIT may be transmitted before the television channel is reassigned to the second transponder. In such embodiments, the new NIT may be provided a trigger time and/or date at which time the new NIT takes effect. As such, when the television channel begins being transmitted using the second transponder at the predefined trigger time and/or date, the new NIT may take effect.

At step 530, the NIT (or some other database/table data storage arrangement) created at step 520 may be received by the television receiver. The television receiver may delete its previous NIT and replace it with the newly received NIT. In some embodiments, if a trigger time/date is included, the new NIT may be stored, but only activated to replace the previous NIT at the trigger time/date. The new NIT may be received via a transponder stream from the satellite. Upon activation of the NIT received at step 530, tuning of television channels, including the television channel, may be updated at step 535. This may involve the television receiver tuning to a different satellite and/or transponder for a particular television channel. The television receiver, upon detecting a different satellite and/or transponder being listed for a television channel, may immediately switch to the different satellite and/or transponder.

At step 545, an electronic programming guide may be presented by the television receiver that indicates a grouping of television channels that are being transmitted using the second transponder. For example, in the electronic programming guide, an icon may be presented next to each channel in the EPC that indicates a "popular" channel that is available for concurrent recording and/or viewing along with each of the other "popular" channels that are being transmitted using the second transponder. From the user's point of view, the user may not be aware that each of these popular channels are being transmitted using the second transponder. Rather, the user may only be aware that each week some number, such as ten, of the most popular television channels are always available for concurrent recording (using a single tuner of the television receiver). As such, from the user's point of view, a greater number of television channels may be available for concurrent recording because the user is likely to be recording off the television channels that have been determined to be most popular. In some embodiments, rather than presenting an icon or other visual indicator next to each television channel in the electronic programming guide, a simple indicator or other graphical element may be presented. Selection of the simple indicator may configure the user's television receiver to automatically concurrently record each of the most popular television channels. As such, by making such a single selection, the user may select multiple television channels for concurrent recording using a single tuner that have been determined to be most popular.

At step 550, at the television receiver, multiple television channels, including the television channel which was reassigned from the first transponder to the second transponder, may be recorded using a single tuner. This single tuner may receive the transponder stream from the second transponder. Based on the usage data and/or social media data gathered at step 505, the most popular television channels may each be transmitted using this transponder stream from the second transponder. Therefore, the multiple television channels recorded from the second transponder may each have been determined to be one of the most popular television channels. At some later period of time, such as each day or each week, the most popular television channels may be reassessed and which television channels are transmitted using the second transponder may change based on this change in popularity.

Figure 6:
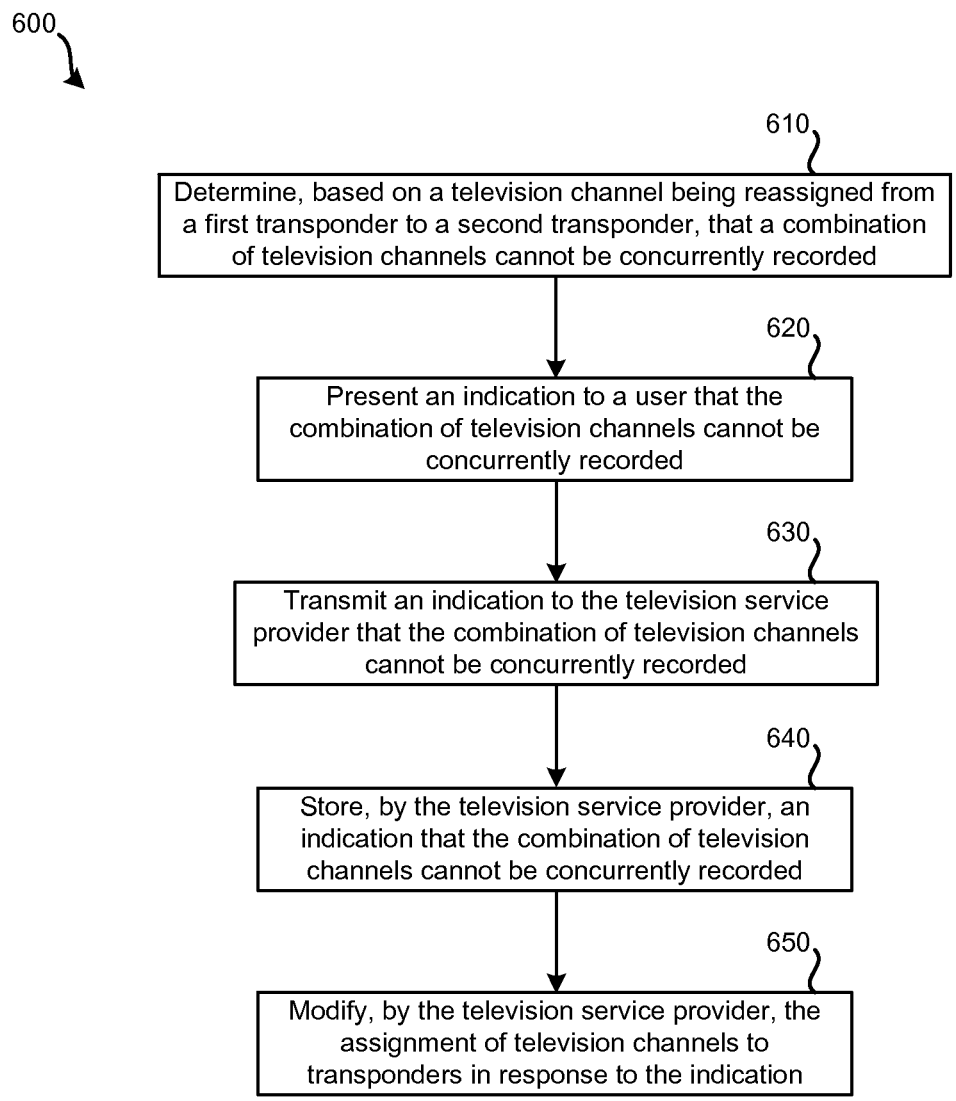
FIG. 6 illustrates an embodiment of a method for providing feedback regarding the availability of television channels for recording.

While moving one or more popular television channels to the same transponder may increase the likelihood that a user may want to record multiple television channels simultaneously from the same transponder stream using a single tuner, for some users the opposite effect may be realized, especially if their programming tastes vary from the norm. The television service provider may want to be aware of such situations, for reasons such as readjusting which television channels are assigned to a transponder or to be aware of subscribers who might be unhappy due to the loss of the ability to record multiple television channels simultaneously using a single tuner. FIG. 6 illustrates an embodiment of a method for providing feedback regarding the availability of television channels for recording. Method 600 may be performed using television service provider system 300 of FIG. 3. Method 600 may also involve the user of satellite television distribution system 100 of FIG. 1 and television receiver 200 of FIG. 2. It should be understood that method 600 may be performed using other embodiments of satellite (or cable) television distribution systems, television receivers (or other forms of television service receivers), and television service provider systems. Means for performing method 600 include television service provider systems, television receivers, television distribution systems, and computerized devices, such as computer system 700 of FIG. 7. Method 600 may be performed in conjunction with method 400 of FIG. 4, method 500 of FIG. 5, or some other method for adjusting the assignment of television channels to transponder streams.

At step 610 (possibly, based on one or more television channels being reassigned from a first transponder to a second transponder), it may be determined, by the television receiver that a combination of television channels that is desired to be recorded concurrently cannot be recorded. This situation may occur because while previously a single tuner was able to receive multiple television channels that were transmitted concurrently in the same transponder stream, at least some of these multiple television channels are now distributed across multiple transponder streams thus requiring two or more tuners to receive the multiple television channels. This situation may also occur if a user selects multiple television channels for concurrent recordings that are transmitted in separate transponder streams. The determination of step 610 may include identifying the combination of television channels that the user is attempting to record simultaneously. An indication of these television channels, and the date/time at which the user was attempting to record the multiple television channels concurrently, may be stored by the television receiver.

As an example of this, consider a television receiver with two tuners. At a particular time, a user may want to record channels 4, 5, 7, and 13. Before a television channel transponder reassignment, channels 4, 5, and 7 were transmitted via a first transponder and television channel 13 was transmitted via a second transponder. As such, before the television channel transponder reassignment, to record these 4 television channels simultaneously, two tuners may have been required. The television service provider may during a reassignment move channel 7 to a third transponder. As such, the television receiver may not be able to record these 4 television channels simultaneously because a third tuner would be required for tuning to the first transponder, the second transponder, and the third transponder simultaneously.

At step 620, an indication may be presented to the user by the television receiver via a display device, such as a television, that indicates the combination of television channels requested to be recorded simultaneously cannot be performed. As such, the user may be required to select one or more television channels for which recording is to be skipped. In some embodiments, the television receiver may suggest a television channel for which to skip recording that minimizes impact. For example, referring to the previous example, either television channel 7 or television channel 13 may be recommended because each of these television channels are on separate transponder streams, while television channels 4 and 5 remain on a single transponder stream.

At step 630, an indication may be transmitted to the television service provider that indicates the combination of television channels that could not be recorded simultaneously. Referring to satellite television distribution system 100 of FIG. 1, while the television channels may be received via satellites 130, the feedback may be provided by television receiver 150 to television service provider system 110 via network 190. Referring to FIG. 3, television service provider may receive and process the feedback using feedback analysis engine 380.

At step 640, the television service provider may store such indications received from multiple television receivers about various combinations of television channels that cannot be concurrently recorded. These indications may be analyzed for patterns to determine television channels which should be moved among transponders to minimize the number of occurrences where users are not able to record desired combinations of television channels concurrently. In some embodiments, the indication is associated with a user's account so that if the user contacts a customer service representative, the representative may be able to explain why the multiple television channels are not available for concurrent recording.

At step 650, based upon feedback received from one or more television receivers that indicates a combination of television channels that cannot be concurrently recorded, the assignment of one or more television channels to various transponders may be modified. For example, this may involve reverting to a previous configuration of television channels being assigned to particular transponders. Following referring to a previous configuration or changing to a new configuration, each television receiver which attempted to record the combination that failed may be notified that the combination is now available for concurrent recording.

Figure 7:
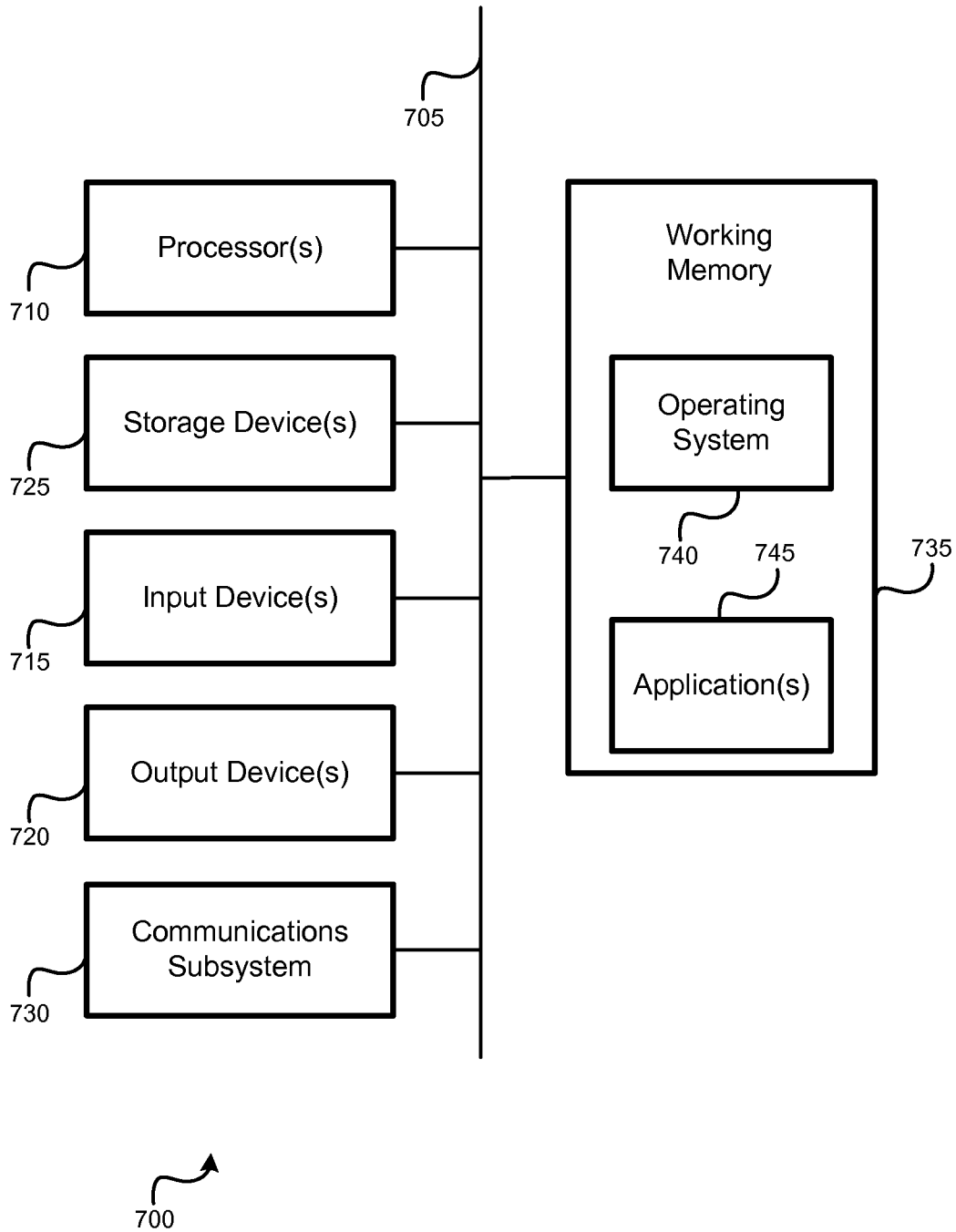
FIG. 7 illustrates an embodiment of a computer system.

A computer system as illustrated in FIG. 7 may be incorporated as part of the previously described computerized devices. For example, computer system 700 can represent some of the components of the television receivers, television service provider system, security system, the modules, multiplexer, and/or the engines discussed in this application. FIG. 7 provides a schematic illustration of one embodiment of a computer system 700 that can perform the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A system for grouping multiple television channels for recording, comprising:
   a television service provider system, comprising:
   one or more processors; and
   a memory communicatively coupled with and readable by the one or more processors and having stored therein processor-readable instructions which, when executed by the one or more processors, cause the one or more processors to:
receive from a plurality of television receivers, television channel usage data indicative of television channels being received by the plurality of television receivers, wherein
the television channel usage data comprises usage data for television channels being transmitted using a plurality of transponders;
analyze the television channel usage data to determine a grouping of television channels; and
based on analyzing the television channel usage data, reassign a television channel from a first transponder to a second transponder for transmission to the plurality of television receivers such that the grouping of television channels are transmitted using the second transponder; and a television receiver of the plurality of television receivers, configured to:
determine a combination of television channels selected by a user to be recorded concurrently cannot be recorded due to the television channel being reassigned from the first transponder to the second transponder by the television service provider system; and
transmit an indication of a recording failure to the television service provider system based on determining the combination of television channels selected to be concurrently recorded at the television receiver cannot occur due to the television channel being reassigned to the second transponder from the first transponder.

2. The system for grouping multiple television channels for recording of claim 1, wherein the processor-readable instructions, when executed, further cause the one or more processors to:
create a table that indicates the television channel is assigned to the second transponder for transmission.

3. The system for grouping multiple television channels for recording of claim 2, wherein the processor-readable instructions, when executed, further cause the one or more processors to:
cause the table to be transmitted to each television receiver of the plurality of television receivers; and
cause the television channel to be transmitted to the plurality of television receivers using the second transponder.

4. The system for grouping multiple television channels for recording of claim 2, wherein the processor-readable instructions that, when executed, cause the one or more processors to reassign the television channel from the first transponder to the second transponder comprise processor-readable instructions, when executed, cause the one or more processors to:
cause the television channel to be simulcast using the first transponder and the second transponder for at least a period of time.

5. The system for grouping multiple television channels for recording of claim 3, wherein the first transponder and the second transponder are on one or more satellites.

6. The system for grouping multiple television channels for recording of claim 1, the television receiver is further configured to:
output for presentation an electronic programming guide (EPG) that indicates the grouping of television channels transmitted by the television service provider via the second transponder.

7. The system for grouping multiple television channels for recording of claim 1, wherein the television receiver being configured to determine the combination of television channels selected to be recorded concurrently cannot be recorded due to the television channel being reassigned from the first transponder to the second transponder comprises the television receiver being configured to:
determine an available number of tuners is less than a number of transponders to which tuning is concurrently required for the combination of television channels to be recorded.

8. A method for grouping multiple television channels for recording, comprising:
receiving, by a television service provider system, from a plurality of television receivers, television channel usage data indicative of television channels being received by the plurality of television receivers, wherein
the television channel usage data comprises usage data for television channels being transmitted using a plurality of transponders;
analyzing, by the television service provider system, the television channel usage data to determine a grouping of television channels;
based on analyzing the television channel usage data, reassigning a television channel from a first transponder to a second transponder for transmission to the plurality of television receivers such that the grouping of television channels are transmitted using the second transponder;
determining, by a television receiver of the plurality of television receivers, a combination of television channels selected by a user to be recorded concurrently cannot be recorded due to the television channel being reassigned from the first transponder to the second transponder by the television service provider system; and
transmitting, by the television receiver, an indication of a recording failure to the television service provider system based on determining the combination of television channels selected to be concurrently recorded at the television receiver cannot occur due to the television channel being reassigned to the second transponder from the first transponder.

9. The method for grouping multiple television channels for recording of claim 8, further comprising:
creating, by the television service provider system, a database that indicates the television channel is assigned to the second transponder for transmission.

10. The method for grouping multiple television channels for recording of claim 9, further comprising:
transmitting, by the television service provider system, the database to each television receiver of the plurality of television receivers; and
transmitting, by the television service provider system, the television channel to the plurality of television receivers using the second transponder.

11. The method for grouping multiple television channels for recording of claim 9, wherein reassigning the television channel from the first transponder to the second transponder comprises simulcasting the television channel using the first transponder and the second transponder for at least a period of time.

12. The method for grouping multiple television channels for recording of claim 10, wherein the first transponder and the second transponder are on one or more satellites.

13. The method for grouping multiple television channels for recording of claim 8, further comprising:
presenting, by the television receiver of the plurality of television receivers, an electronic programming guide (EPG) that indicates the grouping of television channels transmitted by the television service provider via the second transponder.

14. The method for grouping multiple television channels for recording of claim 9, wherein determining the combination of television channels selected to be recorded concurrently cannot be recorded due to the television channel being reassigned from the first transponder to the second transponder is based on:
determining, by the television receiver, an available number of tuners is less than a number of transponders to which tuning is concurrently required for the combination of television channels to be recorded.

15. A non-transitory processor-readable medium for grouping multiple television channels for recording, comprising processor-readable instructions configured to cause one or more processors to:
receive from a plurality of television receivers, television channel usage data indicative of television channels being received by the plurality of television receivers, wherein the television channel usage data comprises usage data for television channels being transmitted using a plurality of transponders;
analyze the television channel usage data to determine a grouping of television channels;
based on analyzing the television channel usage data, reassign a television channel from a first transponder to a second transponder for transmission to the plurality of television receivers such that the grouping of television channels are transmitted using the second transponder; and
receive an indication of a recording failure based on a television receiver determining a combination of television channels selected to be concurrently recorded at the television receiver cannot occur due to the television channel being reassigned to the second transponder from the first transponder.

16. The non-transitory processor-readable medium for grouping multiple television channels for recording of claim 15, wherein the processor-readable instructions, when executed, further cause the one or more processors to:
create a table that indicates the television channel is assigned to the second transponder for transmission.

* * * * *